US012453000B2

(12) United States Patent
Park et al.

(10) Patent No.: US 12,453,000 B2
(45) Date of Patent: Oct. 21, 2025

(54) FLEXIBLE CONNECTING MEMBER AND ELECTRONIC DEVICE INCLUDING SAME

(71) Applicant: Samsung Electronics Co., Ltd., Suwon-si (KR)

(72) Inventors: Sungwon Park, Suwon-si (KR); Sunyoung Kim, Suwon-si (KR); Younghun Seong, Suwon-si (KR); Yongjin Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 416 days.

(21) Appl. No.: 17/879,303

(22) Filed: Aug. 2, 2022

(65) Prior Publication Data

US 2023/0040596 A1    Feb. 9, 2023

Related U.S. Application Data

(63) Continuation of application No. PCT/KR2022/010762, filed on Jul. 22, 2022.

(30) Foreign Application Priority Data

Aug. 5, 2021    (KR) ........................ 10-2021-0103362

(51) Int. Cl.
*H05K 1/02* (2006.01)
*G06F 1/16* (2006.01)
(Continued)

(52) U.S. Cl.
CPC ............ *H05K 1/028* (2013.01); *G06F 1/1683* (2013.01); *H01B 7/08* (2013.01); *H01Q 1/38* (2013.01); *H05K 1/0253* (2013.01)

(58) Field of Classification Search
CPC .......... H05K 1/028; G06F 1/683; H01B 7/08; H01Q 1/38
See application file for complete search history.

(56) References Cited

U.S. PATENT DOCUMENTS 5,675,299 A * 10/1997 Suski .................. H05K 1/0224
333/1
10,485,094 B1 * 11/2019 Isohätälä .............. H05K 3/0014
(Continued)

FOREIGN PATENT DOCUMENTS

JP    2003-133659 A    5/2003
JP    2004-088020 A    3/2004
(Continued)

OTHER PUBLICATIONS

International Search Report dated Nov. 1, 2022, issued in International Patent Application No. PCT/KR2022/010762.
(Continued)

*Primary Examiner* — Hae Moon Hyeon
(74) *Attorney, Agent, or Firm* — Jefferson IP Law, LLP

(57) ABSTRACT

An electronic device is provided. The electronic device includes a housing, and a flexible connecting member disposed inside the housing, the flexible connecting member including a dielectric substrate, at least one signal wire disposed on one surface of the dielectric substrate, and at least one ground disposed on the other surface of the dielectric substrate adjacent to the signal wire. The at least one signal wire and the at least one ground is disposed to be spaced apart from each other when viewed from above the dielectric substrate. A flexible connecting member includes a dielectric substrate, a signal wire disposed on one surface of the dielectric substrate, and a ground disposed on the other surface of the dielectric substrate adjacent to the signal wire. The signal wire and the ground are disposed to be spaced apart from each other when viewed from above the dielectric substrate.

20 Claims, 17 Drawing Sheets

(51) Int. Cl.
    *H01B 1/08*        (2006.01)
    *H01B 7/08*        (2006.01)
    *H01Q 1/38*        (2006.01)

(56) References Cited

U.S. PATENT DOCUMENTS

| | | | | |
|---|---|---|---|---|
| 10,681,824 | B1* | 6/2020 | Hao | H05K 3/1258 |
| 2004/0248434 | A1* | 12/2004 | Fujimura | H01R 4/01 |
| | | | | 439/67 |
| 2006/0246268 | A1* | 11/2006 | Honjo | H05K 1/0253 |
| | | | | 428/209 |
| 2011/0267152 | A1* | 11/2011 | Lee | H01P 3/121 |
| | | | | 333/33 |
| 2012/0247816 | A1* | 10/2012 | Koide | B41J 2/14233 |
| | | | | 174/254 |
| 2012/0274423 | A1 | 11/2012 | Kato | |
| 2013/0010406 | A1* | 1/2013 | Stanley | H05K 5/0013 |
| | | | | 361/679.01 |
| 2014/0168926 | A1* | 6/2014 | Colman | H01R 13/6581 |
| | | | | 361/803 |
| 2014/0299355 | A1* | 10/2014 | Kato | H01B 7/0823 |
| | | | | 174/117 F |
| 2015/0333388 | A1* | 11/2015 | Kato | H01P 3/08 |
| | | | | 333/238 |
| 2016/0093685 | A1* | 3/2016 | Kwon | H10K 59/131 |
| | | | | 257/40 |
| 2016/0181345 | A1* | 6/2016 | Lee | H05K 1/028 |
| | | | | 257/40 |
| 2017/0040673 | A1* | 2/2017 | Kanno | H04B 5/72 |
| 2017/0344073 | A1* | 11/2017 | Kang | G06F 1/1679 |
| 2018/0014417 | A1 | 1/2018 | Seo et al. | |
| 2019/0196549 | A1* | 6/2019 | Lin | G06F 1/1643 |
| 2019/0372033 | A1* | 12/2019 | Li | H10K 59/12 |
| 2020/0037439 | A1* | 1/2020 | Kim | H05K 1/115 |
| 2020/0127361 | A1* | 4/2020 | Lee | H01Q 1/2283 |
| 2020/0236203 | A1* | 7/2020 | Carlson | G06F 1/1652 |
| 2020/0267839 | A1* | 8/2020 | Woo | G06F 1/1681 |
| 2020/0344871 | A1* | 10/2020 | Momose | H04N 23/50 |
| 2021/0185809 | A1* | 6/2021 | Park | H05K 1/0225 |
| 2021/0247806 | A1* | 8/2021 | Lee | G06F 1/1683 |
| 2021/0296750 | A1* | 9/2021 | Chaki | H01P 3/08 |
| 2021/0329784 | A1* | 10/2021 | Park | H05K 1/118 |
| 2021/0345492 | A1* | 11/2021 | Yeon | H05K 1/189 |
| 2022/0124913 | A1* | 4/2022 | Kwak | H04M 1/02 |
| 2023/0040596 | A1* | 2/2023 | Park | H05K 1/02 |
| 2023/0269319 | A1* | 8/2023 | Shim | H04M 1/0264 |
| | | | | 361/679.01 |
| 2024/0333331 | A1* | 10/2024 | Kim | H01Q 1/38 |

FOREIGN PATENT DOCUMENTS

| | | | |
|---|---|---|---|
| JP | 2007-123740 | A | 5/2007 |
| JP | 2007-335455 | A | 12/2007 |
| JP | 2009-054876 | A | 3/2009 |
| KR | 10-0283508 | B1 | 3/2001 |
| KR | 10-1055425 | B1 | 8/2011 |
| KR | 10-2018-0080613 | A | 7/2018 |
| KR | 10-2018-0101891 | A | 9/2018 |
| KR | 10-2019-0110371 | A | 9/2019 |
| KR | 10-2040790 | B1 | 11/2019 |
| KR | 10-2020-0091809 | A | 7/2020 |
| KR | 10-2021-0070362 | A | 6/2021 |
| KR | 20210088609 | A * | 7/2021 |
| KR | 10-2527295 | B1 | 5/2023 |

OTHER PUBLICATIONS

European Search Report dated Dec. 16, 2024, issued in European Application No. 22853319.6.

* cited by examiner

FLEXIBLE CONNECTING MEMBER AND ELECTRONIC DEVICE INCLUDING SAME

CROSS-REFERENCE TO RELATED APPLICATION(S)

This application is a continuation application, claiming priority under § 365 (c), of an International application No. PCT/KR2022/010762, filed on Jul. 22, 2022, which is based on and claims the benefit of a Korean patent application number 10-2021-0103362, filed on Aug. 5, 2021, in the Korean Intellectual Property Office, the disclosure of which is incorporated by reference herein in its entirety.

TECHNICAL FIELD

The disclosure relates to a flexible connecting member and an electronic device including the same. More particularly, the disclosure relates to a flexible connecting member including a structure for maintaining the impedance of a signal (RF) wire to a predetermined level or less, and an electronic device including the same.

BACKGROUND ART

As the degree of integration of electronic devices has increased and ultra-high-speed and large-capacity wireless communication has become popular, multiple functions have recently come to be provided in a single electronic device, such as a mobile communication terminal. For example, various functions, such as an entertainment function (e.g., a game function), a multimedia function (e.g., a music/video reproduction function), a communication and security function for mobile banking or the like, a schedule management function, and an e-wallet function, are integrated in a single electronic device, in addition to a communication function. In addition, electronic devices are increasingly equipped with wider display panels so that users do not have any inconvenience in using multimedia services. In recent years, foldable and/or rollable electronic devices having a flexible display panel is disposed have been disclosed. A foldable and/or electronic device may refer to an electronic device that includes a plurality of housing structures, which relatively rotate with respect to each other.

Meanwhile, as a configuration disposed in an electronic device, circuit boards may be divided into rigid circuit boards and flexible circuit boards according to physical characteristics related to the flexibility thereof. In recent years, a rigid-flexible circuit board (hereinafter referred to as a "flexible circuit board"), in which a rigid circuit board and a flexible circuit board are combined so as to increase the reliability of electrical connection of an electronic device and to implement three-dimensional wiring, has also been used.

Since the commercialization of 4th generation (4G) communication systems, in order to meet the increasing demand for wireless data traffic, 5th generation (5G) communication systems have been actively developed and distributed. In order to achieve a high data rate, the 5G communication systems use an ultra-high frequency of several tens of gigahertz (GHz) or more (or referred to as "millimeter wave (mmWave) communication"). However, in an electronic device including an ultra-high frequency communication module, performance exhibited by the communication module may be affected by a path (e.g., a wire) through which a communication signal is transmitted due to high frequency characteristics.

The above information is presented as background information only to assist with an understanding of the disclosure. No determination has been made, and no assertion is made, as to whether any of the above might be applicable as prior art with regard to the disclosure.

SUMMARY OF THE INVENTION

Technical Problem

In an electronic device, various electric elements (or electronic components) and a printed circuit board on which the various electric elements are mounted are disposed inside a bracket on which components are mounted. In the case of a foldable and/or rollable electronic device, the electric elements and the printed circuit board may be separately disposed in a plurality of housing structures based on a consideration of various factors such as space mountability, communication performance, and heat dissipation performance. In this case, a flexible circuit board, which is easy to bend, may be used in order to connect respective electric elements.

Since at least a portion of the flexible circuit board can be flexibly bent, the flexible circuit board is highly utilized in a narrow space, and may be suitable for use in a configuration that connects the electric elements contained inside a housing structure and the electric elements contained inside other housing structures. However, durability and service life aspects may need to be additionally considered. According to some embodiments, when a foldable and/or rollable electronic device is repeatedly folded and unfolded, stress due to friction with a housing, a component, or another board accumulates in a bending portion of a flexible circuit board, which may result in damage. In addition, according to repeated use of the foldable and/or rollable electronic device, the lifespan of the bending portion may be shortened.

When the foldable and/or rollable electronic device is equipped with an ultra-high frequency communication module (e.g., ultra-high communication in the range of 6 GHz or more and less than 100 GHz) (for example, when a flexible circuit board including a Radio Frequency (RF) signal line is included), a flexible circuit board designed in consideration of RF characteristics may be formed to have a thinner width compared to a board including a general signal line. A change in the impedance of the flexible circuit board including the RF signal line is caused, resulting in a decrease in RF characteristics, for example, an increase in loss.

Aspects of the disclosure are to address at least the above-mentioned problems and/or disadvantages and to provide at least the advantages described below. Accordingly, an aspect of the disclosure is to provide a foldable and/or rollable electronic device that reduces signal loss by maintaining the impedance of a flexible circuit board mounted in the foldable and/or rollable electronic device at a predetermined level or lower.

Another aspect of the disclosure is to improve the lifespan of the bending portion of the flexible circuit board mounted in the electronic device when the foldable and/or rollable electronic device is repeatedly used.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing, and a flexible connecting member disposed inside the housing, the flexible connecting member including a dielectric substrate, at least one signal wire disposed on one surface of the dielectric substrate, and at least one ground disposed on the other surface of the dielectric substrate adjacent to the signal wire. The at least one signal wire and the at least one ground may be disposed to be spaced apart from each other when viewed from above the dielectric substrate.

In accordance with another aspect of the disclosure, a flexible connecting member is provided. The flexible connecting member includes a dielectric substrate, at least one signal wire disposed on one surface of the dielectric substrate, and at least one ground disposed on the other surface of the dielectric substrate adjacent to the signal wire. The at least one signal wire and the at least one ground may be disposed to be spaced apart from each other when viewed from above the dielectric substrate.

Advantageous Effects

According to various embodiments of the disclosure, it is possible to provide a foldable and/or rollable electronic device that reduces signal loss by maintaining the impedance of a flexible circuit board mounted in the foldable and/or rollable electronic device at a predetermined level or lower.

According to various embodiments of the disclosure, it is possible to provide a foldable and/or rollable electronic device capable of reducing the influence of conductors disposed around a flexible circuit board mounted in the foldable and/or rollable electronic device.

According to various embodiments of the disclosure, even when the foldable and/or rollable electronic device is repeatedly used, it is possible to improve the lifespan of the bending portion of the flexible circuit board mounted in the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
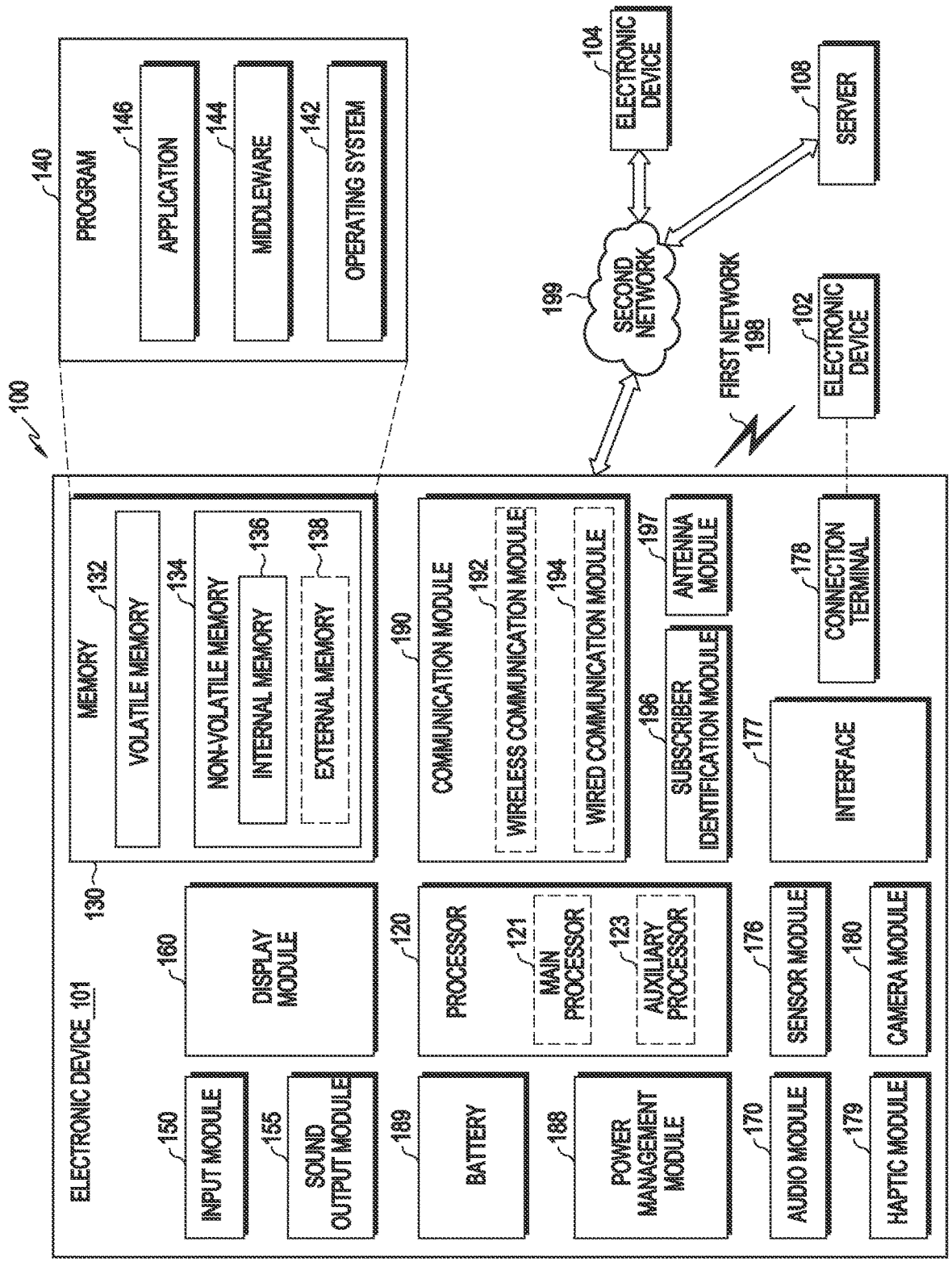
FIG. 1 a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 communicates with the electronic device 104 via the server 108. According to an embodiment, the electronic device 101 includes a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 includes a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 stores various data used by at least one component (e.g., the processor 120 or the sensor module 176) of the electronic device 101. The various data may include, for example, software (e.g., the program 140) and input data or output data for a command related thereto. According to an embodiment of the disclosure, the memory 130 includes the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 outputs sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 visually provides information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 converts a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 detects an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 supports one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 includes a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 converts an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 captures a still image or moving images. According to an embodiment, the camera module 180 may include one or more lenses, image sensors, image signal processors, or flashes.

The power management module 188 manages power supplied to the electronic device 101. According to one embodiment, the power management module 188 may be implemented as at least part of, for example, a power management integrated circuit (PMIC).

The battery 189 supplies power to at least one component of the electronic device 101. According to an embodiment, the battery 189 may include, for example, a primary cell which is not rechargeable, a secondary cell which is rechargeable, or a fuel cell.

The communication module 190 supports establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 transmits or receives a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in another aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
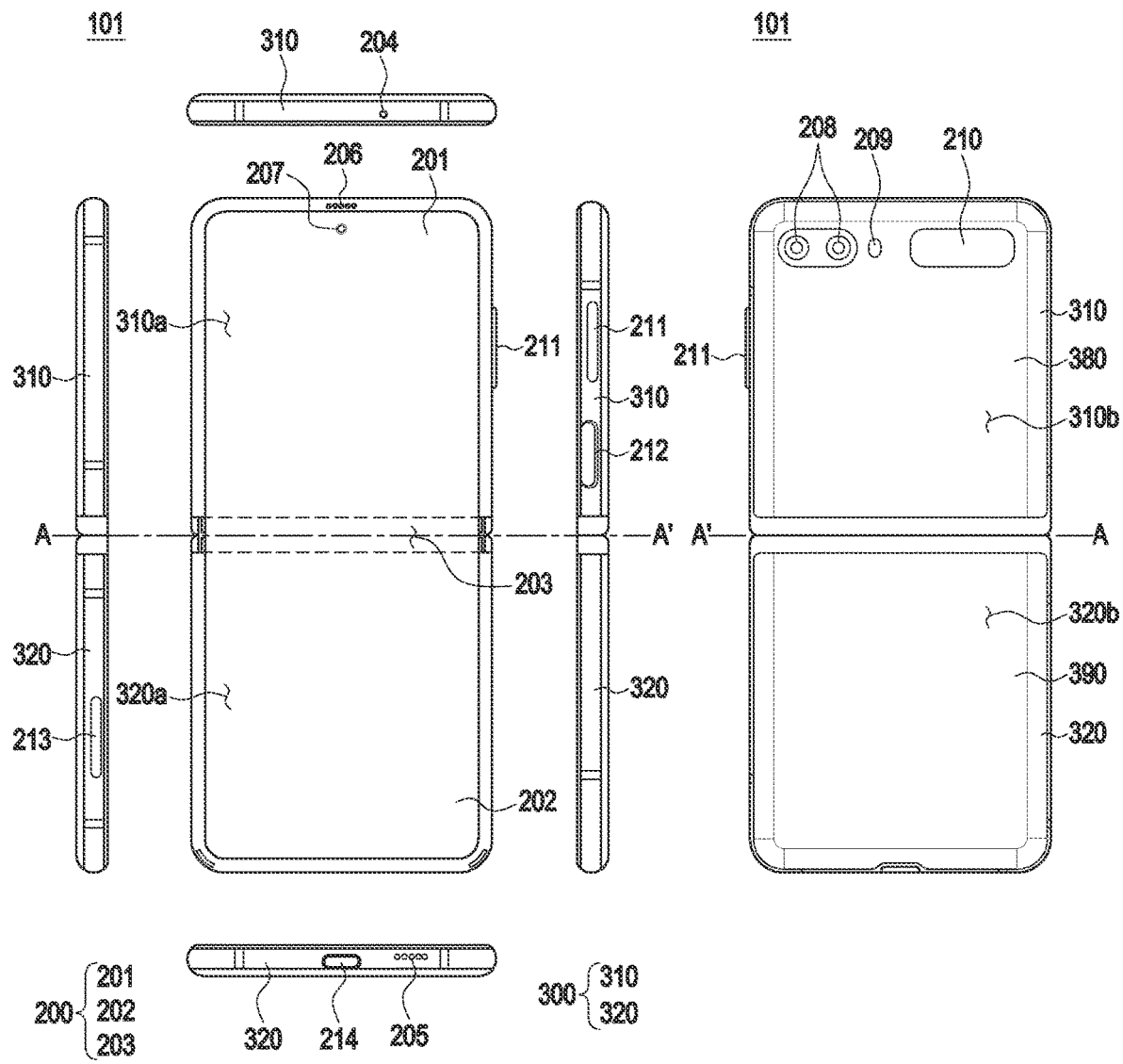
FIG. 2 is a view illustrating a state in which an electronic device is unfolded according to an embodiment of the disclosure.

FIG. 2 is a view illustrating the state in which an electronic device is unfolded according to an embodiment of the disclosure. FIG. 2 illustrates various views showing the front, rear, and side surfaces of the electronic device 101 together.

Figure 3A:
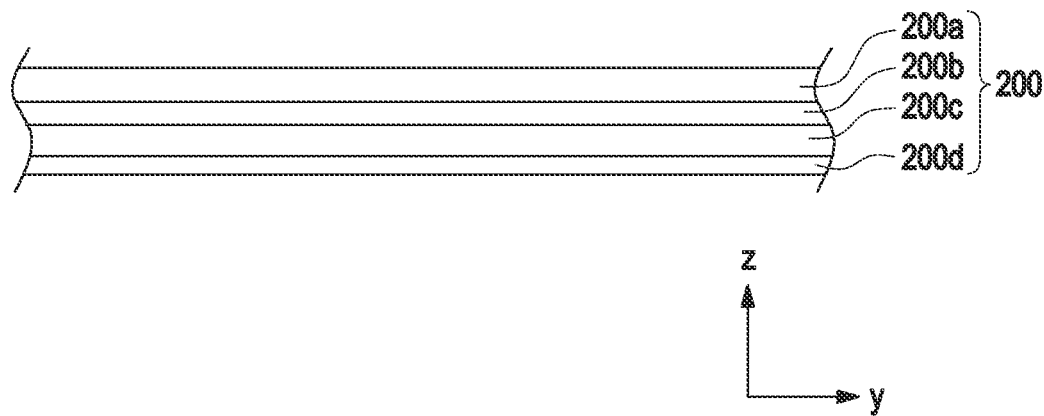
FIG. 3A is a cross-sectional view illustrating a state in which a display portion of an electronic device is fully unfolded according to an embodiment of the disclosure.

FIG. 3A is a cross-sectional view illustrating a state in which a display part of an electronic device is fully unfolded according to an embodiment of the disclosure.

Figure 3B:
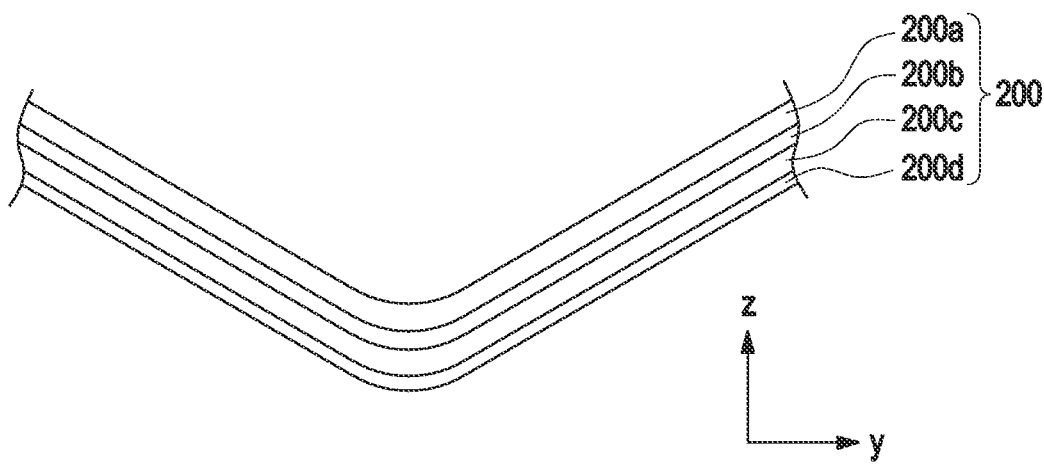
FIG. 3B is a cross-sectional view illustrating an intermediate state in which a display portion of an electronic device is partially unfolded according to an embodiment of the disclosure.

FIG. 3B is a cross-sectional view illustrating a state in which a display part of an electronic device is partially unfolded according to an embodiment of the disclosure.

Referring to FIG. 2, according to an embodiment, an electronic device 101 includes a foldable housing 300 and a flexible or foldable display 200 (hereinafter, simply referred to as a "display" 200) (e.g., the display module 160 in FIG. 1) disposed in a space defined by the foldable housing 300.

According to an embodiment, the surface on which the display 200 is disposed may be defined as the front surface of the electronic device 101. According to an embodiment, at least a portion of the front surface of the electronic device 101 may be defined as a substantially transparent front plate (e.g., a glass plate or a polymer plate including various coating layers). In addition, the surface opposite to the front surface may be defined as the rear surface of the electronic device 101. The rear surface of the electronic device 101 may be defined as a substantially opaque rear plate (hereinafter, referred to as a "rear cover"). The rear cover may be formed of, for example, coated or colored glass, ceramic, a polymer, a metal (e.g., aluminum, stainless steel (STS), or magnesium), or a combination of at least two of these materials. The surface surrounding the space between the front surface and the rear surface may be defined as the side surface of the electronic device 101. The side surface may be defined by a side bezel structure (or a "side member") coupled to the front plate and the rear cover and including a metal and/or a polymer. In some embodiments, the rear cover and the side bezel structure may be integrally formed, and may include the same material (e.g., a metal material such as aluminum).

According to an embodiment, the electronic device 101 includes at least one of a display 200, audio modules 204, 205, and 206, a sensor module 209, camera modules 207 and 208, key input devices 211, 212, and 213, and a connector hole 214. According to an embodiment, in the electronic device 101, at least one of the components (e.g., the key input devices 211, 212, and 213) may be omitted, or other components (e.g., a light-emitting element) may be additionally included.

According to various embodiments, the display 200 may be a display, at least a portion of which is deformable into a planar surface or a curved surface. According to the embodiment illustrated in FIG. 2, the display 200 includes a folding area 203, a first area 201 disposed on one side of the folding area 203 (e.g., the top side of the folding area 203 illustrated in FIG. 2), and a second area 202 disposed on the other side of the folding area 203 (e.g., the bottom side of the folding area 203 illustrated in FIG. 2). However, the area division of the display 200 illustrated in FIG. 2 is illustrative, and the display 200 may be divided into multiple areas (e.g., four or more or two areas) depending on the structure or function thereof. For example, in the embodiment illustrated in FIG. 2, the areas of the display 200 is divided based on the folding area 203 or a folding axis A-A'. However, in another embodiment, the areas of the display 200 may be divided based on another folding area or another folding axis (e.g., a folding axis perpendicular to the folding axis A-A').

According to the embodiment illustrated in FIG. 2, the audio modules 204, 205, and 206 include a microphone hole 204 and speaker holes 205 and 206. The microphone hole 204 may include a microphone disposed therein to acquire external sound, and in some embodiments, a plurality of microphones may be disposed therein to be able to detect the direction of sound. The speaker holes 205 and 206 may include an external speaker hole 205 and a call receiver hole (i.e., speaker hole 206). In some embodiments, the speaker holes 205 and 206 and the microphone hole 204 may be implemented as a single hole, or a speaker (e.g., a piezo speaker) may be included without the speaker holes 205 and 206. The positions and number of microphone holes 204 and speaker holes 205 and 206 may be variable depending on embodiments.

According to the embodiment illustrated in FIG. 2, the camera modules 207 and 208 include a first camera device 207 disposed on the first surface 310a of the first housing structure 310 of the electronic device 101 and a second camera device 208 disposed on the second surface 310b. In addition, the electronic device 101 may further include a flash (not illustrated). The camera devices 207 and 208 may include one or more lenses, an image sensor, and/or an image signal processor. The flash (not illustrated) may include, for example, a light-emitting diode or a xenon lamp.

According to the embodiment illustrated in FIG. 2, the sensor module 209 generates an electrical signal or a data value corresponding to an internal operating state of the electronic device 101 or an external environmental state. Although not illustrated in the drawings, the electronic device 101 may additionally include another sensor module, in addition to, or instead of, the sensor module 209 provided on the second surface 310b of the first housing structure 310. The electronic device 101 may include, as a sensor module, at least one of, for example, a proximity sensor, a fingerprint sensor, a heart rate monitor (HRM) sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to the embodiment illustrated in FIG. 2, key input devices 211, 212, and 213 are disposed on the side surface of the foldable housing 300. In another embodiment, the electronic device 101 may not include some or all of the above-mentioned key input devices 211, 212, and 213, and a key input device, which is not included in the electronic device 101, may be implemented in another form, such as a soft key, on the display 200. In some embodiments, the key input devices may be configured such that key inputs are implemented by sensor modules.

According to the embodiment illustrated in FIG. 2, the connector hole 214 is configured to accommodate a connector (e.g., a USB connector) configured to transmit and receive power and/or data to and from an external electronic device, and to accommodate, in addition to or instead of the connector, a connector configured to transmit and receive an audio signal to and from an external electronic device.

According to the embodiment illustrated in FIG. 2, the foldable housing 300 includes a first housing structure 310, a second housing structure 320, a first rear cover 380, a second rear cover 390, and a hinge structure (e.g., the hinge structure 440 in FIG. 4 to be described later). The foldable housing 300 of the electronic device 101 is not limited to the shape and assembly illustrated in FIGS. 2, 3A, and 3B, but may be implemented by a combination and/or an assembly of different shapes or components. For example, in another embodiment, the first housing structure 310 and the first rear cover 380 may be configured integrally, and the second housing structure 320 and the second rear cover 390 may be configured integrally. According to various embodiments, the term "housing structure" may be a combination and/or an assembly of various components, including a housing.

According to various embodiments, the first housing structure 310 is connected to a hinge structure (e.g., the hinge structure 440 in FIG. 4 to be described later), and may include a first surface 310a oriented in a first direction and a second surface 310b oriented in a second direction opposite to the first direction. The second housing structure 320 may be connected to a hinge structure (e.g., the hinge structure 440 in FIG. 4 to be described later), and may include a third surface 320a oriented in a third direction and a fourth surface 320b oriented in a fourth direction opposite to the third direction. The second housing structure 320 is rotatable about the hinge structure (or the folding axis A-A') relative to the first housing structure 310.

According to various embodiments, the first housing structure 310 and the second housing structure 320 are disposed on opposite sides (or upper and lower sides) about the folding axis A-A', and may have generally symmetrical shapes with respect to the folding axis A-A'. The first housing structure 310 and the second housing structure 320 may form an angle or a distance therebetween, which may be variable depending on whether the electronic device 101 is in an unfolded state, in a folded state, or in a partially unfolded (or partially folded) intermediate state. According to an embodiment, unlike the second housing structure 320, the first housing structure 310 may further include various sensors. However, the first housing structure 310 and the second housing structure 320 may have mutually symmetrical shapes in other areas.

According to various embodiments, at least a portion of the first housing structure 310 and at least a portion of the second housing structure 320 may be made of a metal material or a non-metal material having rigidity of a level selected so as to support the display 200. The at least a portion formed of the metal material may provide a ground plane of the electronic device 101, and may be electrically connected to a ground line provided on a printed circuit board (e.g., the printed circuit board 430 in FIG. 4).

According to various embodiments, the first rear cover 380 is disposed on the rear surface of the electronic device 101 at one side of the folding axis A-A', and may have, for example, a substantially rectangular periphery, which may be covered by the first housing structure 310. Similarly, the second rear cover 390 may be disposed on the rear surface of the electronic device 101 at the other side of the folding axis A-A', and the periphery of the second rear cover 390 may be covered by the second housing structure 320.

According to various embodiments, the first rear cover 380 and the second rear cover 390 may have substantially symmetrical shapes about the folding axis A-A'. However, the first rear cover 380 and the second rear cover 390 do not necessarily have mutually symmetrical shapes, and in another embodiment, the electronic device 101 may include a first rear cover 380 and a second rear cover 390 having various shapes. In still another embodiment, the first rear cover 380 may be configured integrally with the first housing structure 310, and the second rear cover 390 may be configured integrally with the second housing structure 320.

According to various embodiments, the first rear cover 380, the second rear cover 390, the first housing structure 310, and the second housing structure 320 define a space in which various components (e.g., a printed circuit board or a battery) of the electronic device 101 can be disposed. According to an embodiment, one or more components may be disposed or visually exposed on the rear surface of the electronic device 101. For example, at least a portion of a sub-display 210 may be visually exposed through the first rear cover 380. In another embodiment, one or more components or sensors may be visually exposed through the first rear cover 380. In various embodiments, the sensors may include a proximity sensor and/or a rear camera. Although not separately illustrated in the drawings, one or more components or sensors may be visually exposed through the second rear cover 390.

According to various embodiments, the front camera 207 exposed to the front surface of the electronic device 101 through one or more openings or the rear camera 208 exposed through of the first rear cover 380 includes one or more lenses, an image sensor, and/or an image signal processor. The flash 209 may include, for example, a light-emitting diode or a xenon lamp. In some embodiments, two or more lenses (e.g., an infrared camera, a wide-angle lens, and a telephoto lens), and image sensors may be disposed on one surface of the electronic device 101. The front camera 207 may be disposed on the front of the electronic device 101, and the display 210 may be disposed between the outside of the electronic device 101 and the front camera 207. According to an embodiment, the front camera 207 may be configured as an under display camera (UDC). The front camera 207 configured as the UDC may not be exposed to the outside. Accordingly, a hole formed for disposing the front camera 207 may not be recognized by a user, and an area of the display 210 disposed above the front camera 207 may implement a picture or an image.

The display 200 according to various embodiments will be described in more detail with reference to FIGS. 3A and 3B.

According to various embodiments, FIG. 3A represents a fully unfolded state of the display part, and FIG. 3B represents a partially unfolded state (or partially folded state) of the display part.

According to various embodiments, the display part of the electronic device 101 includes a configuration that displays a screen through a display and a configuration that is connected to the display and moves integrally with the display.

Referring to FIG. 3A, the display part includes a display panel 200c and a touch panel 200d disposed adjacent to the display panel 200c.

The electronic device 101 may be variable to a folded state or an unfolded state. The electronic device 101 may be foldable in two types, i.e., an "in-folding" type in which the front surface of the electronic device 101 is folded to form an acute angle when viewed in the direction of the folding axis (e.g., A-A' in FIG. 2) and an "out-folding" type in which the front surface of the electronic device 101 is folded to form an obtuse angle when viewed in the direction of the folding axis. For example, in the electronic device 101, the first surface 310*a* may face the third surface 320*a* in the state in which the electronic device 101 is folded in the in-folding type, and the third direction may be substantially the same as the first direction in the fully unfolded state. As another example, in the state in which the electronic device 101 is folded in the out-folding type, the second surface 310*b* may face the fourth surface 320*b*.

The in-folding type refers to a type in which the display 200 is not exposed to the outside in the fully folded state. The out-folding type refers to a type in which the display 200 is exposed to the outside in the fully folded state.

Referring to FIG. 3B, it illustrates an intermediate state in which the electronic device 101 is partially unfolded in the process in which the electronic device 101 is folded in the in-folding type. Hereinafter, for convenience, the electronic device 101 will be described focusing on the state of being folded in the in-folding type, but it should be noted that these descriptions may also be applicable to the state in which the electronic device 101 is folded in the out-folding type.

According to the embodiments illustrated in FIGS. 3A and 3B, the display 200 includes a display panel 200*c*, a polarizing layer 200*b* disposed on the display panel 200*c*, and a window member 200*a* forming the external appearance of the display. The display panel 200*c*, the polarizing layer 200*b*, and the window member 200*a* form a single display 200, and may be formed of a flexible material. Accordingly, as illustrated in FIG. 3A, when an external force is applied in the state in which the display 200 is unfolded, the display 200 is bendable as illustrated in FIG. 3B. Alternatively, when an external force is applied in the state in which the display 200 is partially folded as illustrated in FIG. 3B, the display 200 is unfoldable as illustrated FIG. 3A.

According to various embodiments, the electronic device 101 detects an input (e.g., user input or input through the input module 150 of FIG. 1) on the surface of the display 200 using the touch panel 200*d*. The input capable of being recognized by the touch panel 200*d* may include not only input through direct contact with the surface of the display 200, but also input through hovering. According to an embodiment, the touch panel 200*d* may have substantially the same area as the display 200. According to various embodiments, the touch panel 200*d* may be disposed on the top surface or the rear surface of the display 200. As an embodiment, FIGS. 3A and 3B illustrate the state in which the touch panel 200*d* is attached to the rear surface of the display 200.

According to an embodiment, the display 200 may be at least partially made of a material that transmits radio waves or magnetic fields. Since the display 200 may be equipped with a display panel 200*c* and/or a touch panel 200*d*, the display 200 may be used as an output device that outputs a screen and as an input device that is provided with a touch screen function. The display panel 200*c* may include a display element layer including one or more pixels and a thin-film transistor (TFT) layer connected to the display element layer. According to various embodiments, the display panel 200*c* may correspond to a panel such as a liquid crystal display (LCD), a light-emitting diode (LED), or an organic light-emitting diode (OLED), and may display various images according to various operation states, application execution, content, or the like of the electronic device 101.

According to various embodiments, as the touch panel 200*d*, various types of touch panels may be included. For example, various touch panels, such as a capacitive touch panel that detects a change in capacitance, a pressure-sensitive touch panel that detects a position by detecting a pressure acting on the panel, an optical touch panel using infrared rays, and a transparent-electrode-type touch panel using contacts of a transparent conductive film, may be used. In addition, various types of input position detection panels not mentioned above, such as an electromagnetic resonance type touch panel, may be used.

According to various embodiments, the window member 200*a* serves as a protective film for protecting the display panel 200*c*. As a protective film, the window member 200*a* may be made of a material that protects the display panel 200*c* from external impacts, is resistant to scratches, and generates fewer wrinkles in the folding area even when the foldable housing is repeatedly folded and unfolded. For example, as the material of the window member 200*a*, a clear polyimide (CPI) film or ultra-thin glass (UTG) may be included.

Figure 4:
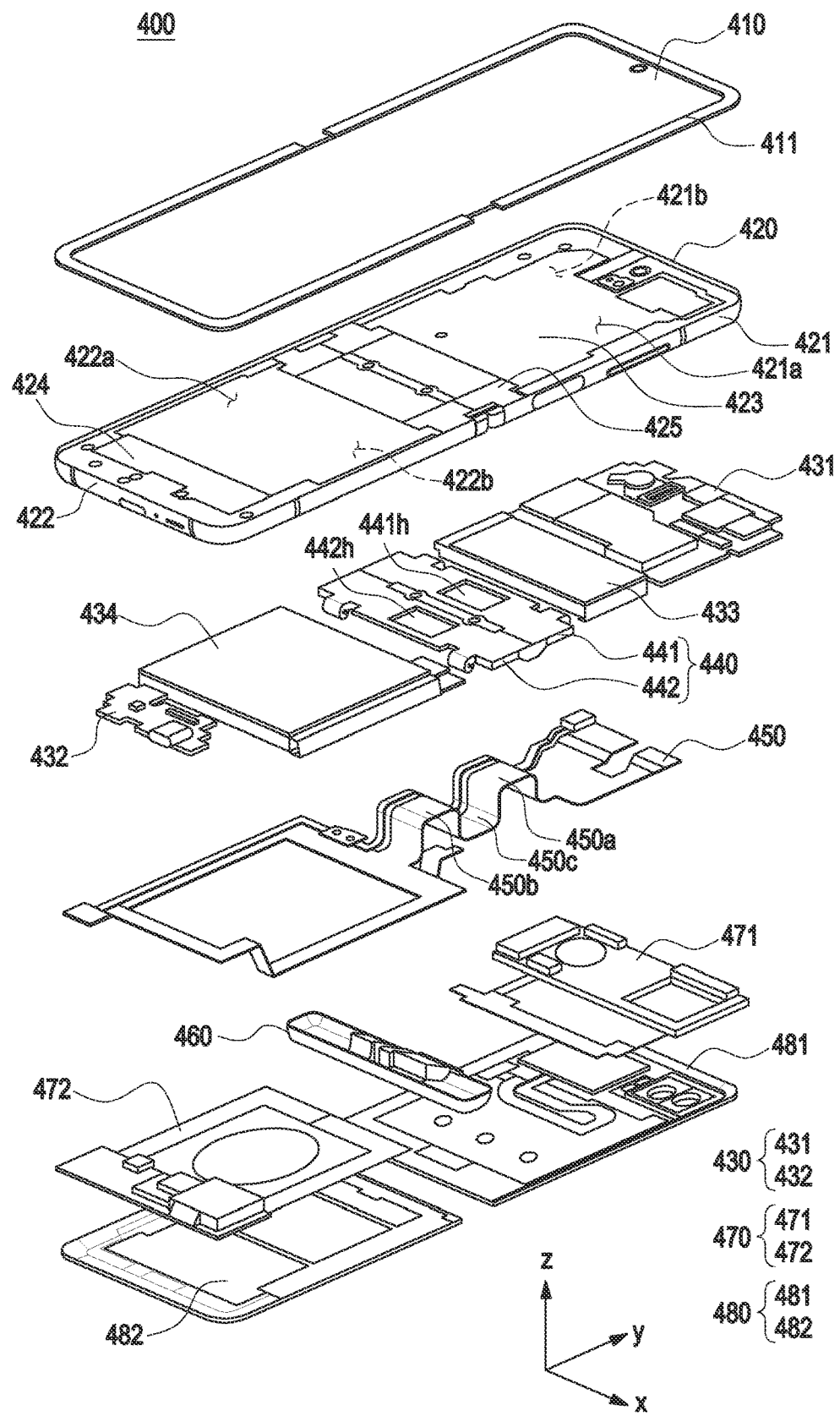
FIG. 4 is an exploded perspective view of an electronic device according to an embodiment of the disclosure.

FIG. 4 is an exploded perspective view illustrating an electronic device (e.g., the electronic device 101 in FIG. 1) according to an embodiment of the disclosure.

Referring to FIG. 4, in various embodiments, an electronic device 400 includes a display 410 (e.g., the display 200 in FIG. 2), a foldable housing 420 (e.g., the foldable housing 300 in FIG. 2), a printed circuit board 430, a hinge structure 440, a flexible connecting member 450, a hinge cover 460, an antenna module 470, and a rear cover 480. Hereinafter, a detailed description of components overlapping those described with reference to FIGS. 2, 3A, and 3B (e.g., the display 410, the foldable housing 420, and the rear cover 480) will be omitted.

According to an embodiment, the display 410 is exposed through a substantial portion of a front plate 411. In some embodiments, the shape of the display 410 may be substantially the same as the shape of the periphery of the front plate 411.

According to various embodiments, the foldable housing 420 includes a first housing 421 and a second housing 422. According to an embodiment, the first housing 421 may include a first surface 421*a* and a second surface 421*b* facing away from the first surface 421*a*, and the second housing 422 may include a third surface 422*a* and a fourth surface 422*b* facing away from the third surface 422*a*. The foldable housing 420 may additionally or alternatively include a bracket assembly. The bracket assembly may include a first bracket assembly 423 disposed in the first housing 421 and a second bracket assembly 424 disposed in the second housing 422. At least a portion of the bracket assembly, for example, a portion 425 including at least a portion of the first bracket assembly 423 and at least a portion of the second bracket assembly 424, may serve as a plate for supporting the hinge structure 440.

According to various embodiments, various electric elements are disposed on the printed circuit board 430. For example, a processor (e.g., the processor 120 in FIG. 1), a memory (e.g., the memory 130 in FIG. 1), and/or an interface (e.g., the interface 177 in FIG. 1) may be mounted on the printed circuit board 430. The processor may include, for example, one or more of a central processing unit, an application processor, a graphics processing unit, an image signal processor, a sensor hub processor, or a communication processor. The memory may include, for example, a volatile memory or a nonvolatile memory. The interface may include, for example, a high-definition multimedia interface (HDMI), a universal serial bus (USB) interface, an SD card interface, and/or an audio interface. The interface may electrically or physically connect, for example, the electronic device 400 to an external electronic device and may include a USB connector, an SD card/a maximum material condition (MMC) connector, or an audio connector.

According to various embodiments, the printed circuit board 430 includes a first printed circuit board 431 disposed on the first bracket assembly 423 side and a second printed circuit board 432 disposed on the second bracket assembly 424 side. The first printed circuit board 431 and the second printed circuit board 432 may be disposed inside the space defined by the foldable housing 420, the bracket assemblies 423 and 424, the first rear cover 481, and/or the second rear cover 482. Components for implementing various functions of the electronic device 400 may be mounted on the first printed circuit board 431 and the second printed circuit board 432 to be separated from each other. For example, a processor may be disposed on the first printed circuit board 431, and an audio interface may be disposed on the second printed circuit board 432.

According to various embodiments, a battery is disposed adjacent to the printed circuit board 430 so as to supply power to the electronic device 400. At least a portion of the battery may be disposed on substantially the same plane as, for example, the printed circuit board 430. According to an embodiment, a first battery 433 may be disposed adjacent to the first printed circuit board 431, and a second battery 434 may be disposed adjacent to the second printed circuit board 432. The battery is a device for supplying power to at least one component of the electronic device 400, and may include, for example, a non-rechargeable primary battery, a rechargeable secondary battery, or a fuel cell. The battery may be integrally disposed inside the electronic device 400, or may be disposed to be detachable/attachable from/to the electronic device 400. According to various embodiments, the hinge structure 440 is configured to support the foldable housing 420 and/or the bracket assemblies 423 and 424 such that the foldable housing 420 is rotatable about a folding axis (e.g., A-A' in FIG. 2). According to an embodiment, the hinge structure 440 includes a first hinge structure 441 disposed on the first printed circuit board 431 side and a second hinge structure 442 disposed on the second printed circuit board 432 side. The hinge structure 440 may be disposed between the first printed circuit board 431 and the second printed circuit board 432. According to an embodiment, the hinge structure 440 may be formed substantially integrally with a portion 425 including at least a portion of the first bracket assembly 423 and at least a portion of the second bracket assembly 424.

According to various embodiments, the "housing structure" is a structure that includes a foldable housing 420, and one or more components disposed inside the foldable housing 420 may be assembled and/or combined with each other. The housing structure may include a first housing structure and a second housing structure. For example, an assembled configuration that includes the first housing 421 and further includes at least one of the first bracket assembly 423, the first printed circuit board 431, and the first battery 433 disposed inside the first housing 421 may be referred to as a "first housing structure". As another example, an assembled configuration that includes the second housing 422 and further includes at least one of the second bracket assembly 424, the second printed circuit board 432, and the second battery 434 disposed inside the second housing 422 may be referred to as a "second housing structure". However, it should be noted that the "first housing structure" and the "second housing structure" are not limited to the addition of the above-described components, and various other components may be additionally included or omitted.

According to various embodiments, the flexible connecting member 450 is, for example, a flexible printed circuit board (FPCB), and connects various electrical components disposed on the first printed circuit board 431 and the second printed circuit board 432. To this end, the flexible connecting member 450 may be disposed across the "first housing structure" and the "second housing structure". According to an embodiment, the flexible connecting member 450 may be disposed so as to cross at least a portion of the hinge structure 440. According to an embodiment, the flexible connecting member 450 may be configured to connect the first printed circuit board 431 and the second printed circuit board 432 to each other across, for example, the hinge structure 440 in a direction parallel to the y-axis of FIG. 4. According to another embodiment, the flexible connecting member 450 may be fitted and coupled to the openings 441*h* and 442*h* in the hinge structure 440. In this case, a portion 450*a* of the flexible connecting member 450 may be disposed to cross one side (e.g., the upper portion) of the first hinge structure 441, and the other portion 450*b* of the flexible connecting member 450 may be disposed to cross one side (e.g., the upper portion) of the second hinge structure 442. In addition, still another portion 450*c* of the flexible connecting member 450 may be disposed on the other sides (e.g., the lower portions) of the first hinge structure 441 and the second hinge structure 442. At a position adjacent to the first hinge structure 441 and the second hinge structure 442, a space (hereinafter referred to as a "hinge space") covered by at least a portion of the first hinge structure 441, at least a portion of the second hinge structure 442, and at least a portion of the hinge cover 460 may be provided. According to an embodiment, at least a portion 450*c* of the flexible connecting member 450 may be disposed in the hinge space.

According to various embodiments, the hinge cover 460 is configured to cover at least a portion of the hinge space. The hinge cover 460 may close the hinge space together with the hinge structure 440, and may protect the structure (e.g., at least a portion 450*c* of the flexible connecting member 450) disposed inside the hinge space from an external impact. According to an embodiment, the hinge cover 460 is disposed between the first housing 421 and the second housing 422. According to an embodiment, the hinge cover 460 is coupled to each of at least a portion of the first housing and at least a portion of the second housing.

According to various embodiments, the antenna module 470 (e.g., the antenna module 197 of FIG. 1) is disposed between the rear cover 480 and the battery. The antenna module 470 may include a plurality of antenna modules in a single electronic device 400. For example, the antenna module 470 may include a first antenna module 471 disposed on the first housing 421 side and a second antenna module 472 disposed on the second housing 422 side. The antenna module may include at least one radiator. In addition, the antenna module 470 may include, for example, a near-field communication (NFC) antenna, a wireless charging antenna, and/or a magnetic secure transmission (MST) antenna. The antenna module 470 may perform short-range communication with, for example, an external electronic device, or may transmit/receive power required for charging to/from the external device in a wireless manner. In another embodiment, an antenna structure may be formed by a portion of a side bezel structure of the foldable housing 420, a portion of a bracket assembly, or a combination thereof.

According to various embodiments, the rear cover 480 includes a first rear cover 481 and a second rear cover 482. The rear cover 480 may be coupled to the foldable housing 420 so as to protect the above-described components (e.g., the printed circuit board 430, the battery, the flexible connecting member 450, and the antenna module 470) disposed inside the foldable housing 420. As described above, the rear cover 480 may be configured substantially integrally with the foldable housing 420.

Figure 5:
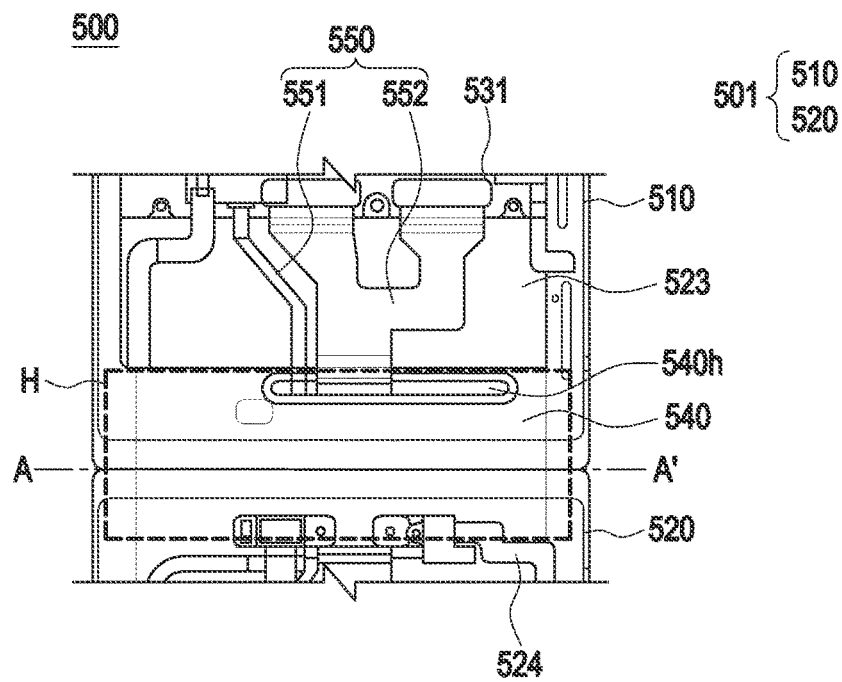
FIG. 5 is a view illustrating a portion of an inside of an electronic device according to an embodiment of the disclosure.

FIG. 5 is a view illustrating a portion of the inside of an electronic device (e.g., the electronic device 400 in FIG. 4) according to an embodiment of the disclosure.

Referring to FIG. 5, in a view 500, a foldable housing 501 (e.g., the foldable housing 420 in FIG. 4) includes a first housing 510 and a second housing 520. The first housing 510 (e.g., the first housing 421 in FIG. 4) and the second housing 520 (e.g., the second housing 422 in FIG. 4) may be cover portions that cover a first housing structure (e.g., the first housing structure 310 in FIG. 2) and a second housing structure (e.g., the second housing structure 320 in FIG. 2), respectively.

According to the embodiment illustrated in FIG. 5, the flexible connecting member 550 lies across at least a portion of the inside of the first housing structure (e.g., the first housing structure 310 in FIG. 2) and at least a portion of the inside of the second housing structure (e.g., the second housing structure 320 in FIG. 2). The description "the flexible connecting member 550 lies across the inside of a housing structure" may mean that the flexible connecting member 550 having a relatively long elongated shape is disposed above or below the housing structure (or the components inside the housing structure). As described above, the housing structure may include a housing and may be an assembled configuration including at least one of a bracket assembly, a printed circuit board, and a battery disposed inside the housing. Accordingly, the description "the flexible connecting member 550 lies across at least a portion of the inside of the housing structure" may be interpreted similarly to the description "the flexible connecting member lies across at least some of the components included in the housing structure". For example, the flexible connecting member 550 may lie across at least a portion of a first bracket assembly 523 (e.g., the first bracket assembly 423 in FIG. 4) and at least a portion of a second bracket assembly 524 (e.g., the second bracket assembly 424 in FIG. 4).

According to the embodiment illustrated in FIG. 5, when viewing the inside of the foldable housing 501 from above, at least a portion of the flexible connecting member 550 is covered by the hinge structure 540. The portion H covered by the hinge structure 540 may be a portion disposed in a hinge space. In addition, the portion H covered by the hinge structure 540 may be a portion in which movement (or bending) occurs repeatedly in the flexible connecting member 550 during unfolding and folding operations of the foldable electronic device, that is, a bending portion. In the bending portion of the flexible connecting member 550, stresses from friction with housings, components, or other substrates may accumulate.

According to various embodiments, the flexible connecting member 550 included in the foldable electronic device includes one or more flexible connecting members 551 and 552. According to an embodiment, at least a portion of the flexible connecting member 550 lies across the inside of the first housing structure including the first housing 510, the first bracket assembly 523, and the first printed circuit board 531, and another portion lies across the inside of the second housing structure including the second housing 520 and the second bracket assembly 524. For reference, the second printed circuit board may be omitted in FIG. 5. The flexible connecting member 550 may lie on the first housing structure and the second housing structure across the hinge structure 540. In this case, a portion of the flexible connecting member 550 may be configured to pass through an opening 540h formed in the hinge structure 540.

Figure 6:
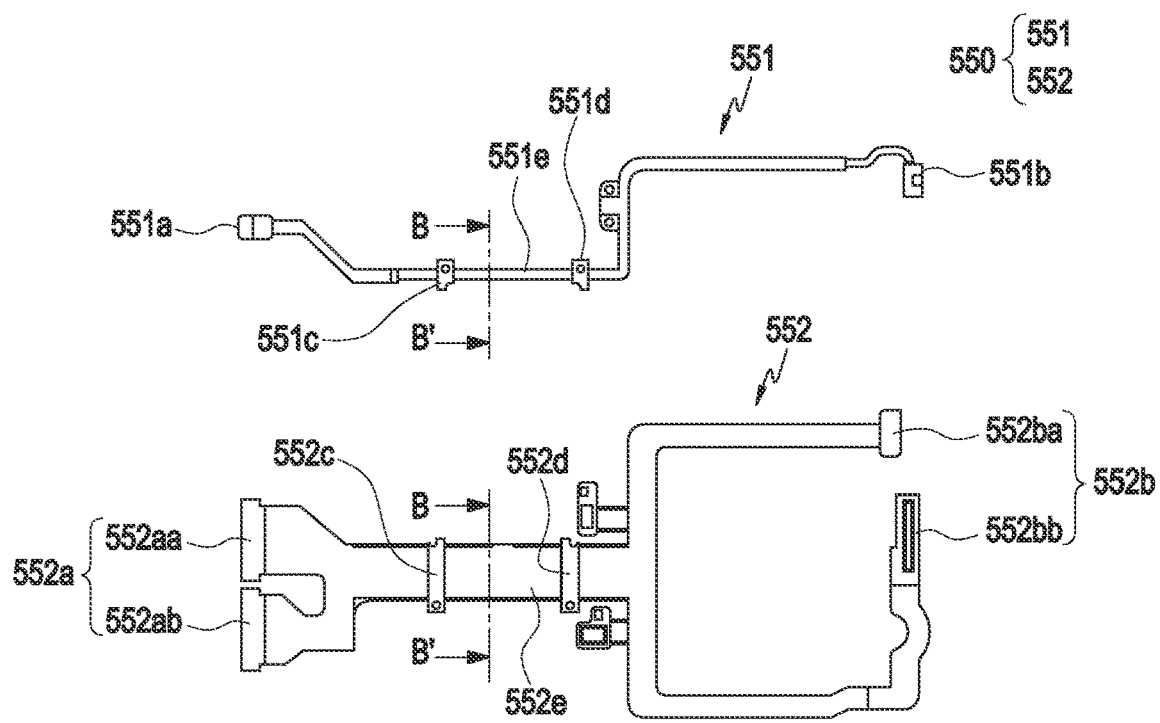
FIG. 6 is a view illustrating flexible connecting members according to an embodiment of the disclosure.

FIG. 6 is a view illustrating a flexible connecting member 550 according to an embodiment of the disclosure.

Referring to FIG. 6, according to various embodiments of the disclosure, the flexible connecting member 550 includes one or more flexible connecting members. In the example illustrated in FIG. 6, the flexible connecting member 550 includes a first flexible connecting member 551 and a second flexible connecting member 552. Although not illustrated in the drawings, the flexible connecting member 550 may further include a third flexible connecting member (not illustrated) or other flexible connecting members.

The flexible connecting member 550, the first flexible connecting member 551, and the second flexible connecting member 552 illustrated in FIG. 6 may be respectively the same as or similar to the flexible connecting member 550, the first flexible connecting member 551, and the second flexible connecting member 552 illustrated in FIG. 5. Accordingly, a description of the same configuration may be omitted.

In the embodiment of FIG. 6, the first flexible connecting member 551 and the second flexible connecting member 552 is illustrated as two flexible connecting members that are completely separated from each other.

As another example, unlike this, substantially one flexible connecting member may be divided into a first flexible connecting member 551 and a second flexible connecting member 552. For example, substantially one flexible connecting member, which is not physically divided, may be divided into a first flexible connecting member 551 and a second flexible connecting member 552 according to the types of signal lines, and may be branched into two or more branches in only some of the areas in which the flexible connecting members are located. For example, although not illustrated in the drawings, the first flexible connecting member 551 and the second flexible connecting member 552 may have a form of an integrated flexible connecting member inside the first housing structure (e.g., the first housing structure 310 in FIG. 2), and may be branched into two different flexible connecting members 551 and 552 inside the second housing structure (e.g., the second housing structure 320 in FIG. 2). As described above, it should be noted that the shape of the flexible connecting members may be variously set for each embodiment. In the following description, for convenience of description, a case in which two flexible connecting members 551 and 552, which are physically spaced apart from each other and have different shapes, will be mainly described, but it should be noted that the scope of the disclosure is not necessarily limited thereto.

Referring to FIG. 6 again, according to an embodiment, the first flexible connecting member 551 lies across at least a portion of the inside of the first housing structure (e.g., the first housing structure 310 in FIG. 2) and at least a portion of the second housing structure (e.g., the second housing structure 320 in FIG. 2). The second flexible connecting member 552 may also lie across at least a portion of the first housing structure (e.g., the first housing structure 310 in FIG. 2) and at least a portion of the second housing structure (e.g., the second housing structure 320 in FIG. 2).

According to various embodiments, each of the first and second flexible connecting members 551 and 552 include a means to be connected to at least one of a first printed circuit board (e.g., the first printed circuit board 431 in FIG. 4) or a second printed circuit board (e.g., the second printed circuit board 432 in FIG. 4). According to an embodiment, the first flexible connecting member 551 electrically connects the first printed circuit board (e.g., the first printed circuit board 431 in FIG. 4) and the second printed circuit board (e.g., the second printed circuit board 432 in FIG. 4) to each other via connecting ends 551*a* and 551*b* disposed at the opposite ends thereof. According to an embodiment, the second flexible connecting member 552 may also electrically connect the first printed circuit board (e.g., the first printed circuit board 431 in FIG. 4) and the second printed circuit board (e.g., the second printed circuit board 432 in FIG. 4) to each other via connecting ends 552*a* and 552*b* disposed at the opposite ends thereof. According to an embodiment, the connecting end 552*a* may include a first connecting end 552*aa* and a second connecting end 552*ab*, and the connecting end 552*b* may include a third connecting end 552*ba* and a fourth connecting end 552*bb*. According to an embodiment, the first printed circuit board 431 and the second printed circuit board 432 may be electrically connected to each other via the first to fourth connecting ends 552*aa*, 552*ab*, 552*ba*, and 552*bb*. The connecting ends may each include a receptacle or a header in which at least one pin is provided. The first and second flexible connecting members 551 and 552 may be connected to at least one of the first printed circuit board and the second printed circuit board via various other means as well as a receptacle or header structure. For example, the flexible connecting members 551 and 552 may be connected at least one of the first printed circuit board (e.g., the first printed circuit board 431 in FIG. 4) or the second printed circuit board (e.g., the second printed circuit board 432 in FIG. 4) via a bonding part formed through a hot-bar process using thermocompression. The shapes of the connecting ends and the manufacturing method therefor are not limited to any specific embodiment. According to various embodiments, according to the shapes of the connecting ends, the first and second flexible connecting members 551 and 552 may include, for example, a flexible printed circuit (FPC) or a flexible flat cable (FFC) type connector structure, a board to board (B to B) type connector structure, a zip type connector structure, a bonding type connector structure formed through a hot-bar process, a low insertion force (LIF) connector structure, or a zero insertion force (ZIF) connector structure.

According to an embodiment, the first flexible connecting member 551 includes, along the longitudinal direction of the first flexible connecting member 551, a rigid portion 551*c* fixed to the side of the first housing structure (e.g., the first housing structure 310 in FIG. 4), a rigid portion 551*d* fixed to the side of the second housing structure (e.g., the second housing structure 320 in FIG. 4), and a flex portion 551*e* disposed between the rigid portions 551*c* and 551*d*. According to an embodiment, the second flexible connecting member 552 may includes, along the longitudinal direction of the flexible connecting member 551, a rigid portion 552*c* fixed to the side of the first housing structure (e.g., the first housing structure 310 in FIG. 4), a rigid portion 552*d* fixed to the side of the second housing structure (e.g., the second housing structure 320 in FIG. 4), and a flex portion 552*e* disposed between the rigid portions 552*c* and 552*d*. The description "the rigid portions 551*c* and 551*d* of the first flexible connecting member 551 are fixed to the side of the first housing structure and the side of the second housing structure" may include, for example, the case in which the rigid portion 551*c* of the first flexible connecting member 551 is fixed to the first hinge structure (e.g., the first hinge structure 441 in FIG. 4), the first printed circuit board (e.g., the first printed circuit board 431 in FIG. 4), or the first bracket assembly (e.g., the first bracket assembly 423 in FIG. 4) disposed inside the first housing structure 310. Like this, the description may include the case in which the rigid portion 551*d* of the first flexible connecting member 551 is fixed to the second hinge structure (e.g., the second hinge structure 442 in FIG. 4), the second printed circuit board (e.g., the second printed circuit board 432 in FIG. 4), or the second bracket assembly (e.g., the second bracket assembly 424 in FIG. 4) disposed inside the second housing structure 320. According to an embodiment, the description "the rigid portions 552*c* and 552*d* of the second flexible connecting member 552 are fixed to the side of the first housing structure side and the side of the second housing structure" may be similarly applicable to an embodiment in which the rigid portions 551*c* and 551*d* of the first flexible connecting member 551 are fixed to the first housing structure side and the second housing structure side.

According to various embodiments, the first and second flexible connecting members 551 and 552 provide at least one electrically conductive path connecting the first printed circuit board (e.g., the first printed circuit board 431 in FIG. 4) and the second printed circuit board (e.g., the second printed circuit board 432 in FIG. 4) to each other. Power or a control signal provided from the power management module or the processor may be transmitted to an internal component of the electronic device 101 through the electrically conductive path. As another example, the flexible connecting members 551 and 552 may each include an RF wire, which is a high-frequency signal line, as an electrically conductive path for transmitting a communication signal provided from an RF transceiver or a communication signal received via a communication device to another RF transceiver. For example, the first flexible connecting member 551 may include a wire (or an electrically conductive path) for transmitting a communication signal including an RF signal. In addition, the second flexible connecting member 552 may include a wire for transmitting an electrical signal that is less sensitive to an impedance change than a wire included in the first flexible connecting member 551. For example, the second flexible connecting member 552 may include a power wire. According to another embodiment, the second flexible connecting member 552 may include a wire for transmitting data and/or a wire for transmitting a control signal (an electrically conductive path) in addition to or instead of the power wire. According to an embodiment, the first flexible connecting member 551 may be formed to be thinner and narrower than the second flexible connecting member 552 depending on RF signal characteristics. Therefore, when the first flexible connecting member 551 including an electrically conductive path for transmitting an RF signal is repeatedly used within the hinge space, the durability thereof will be relatively weak compared to the second flexible connecting member 552, and it may be difficult to exhibit smooth communication performance because the first flexible connecting member 551 is vulnerable to a change in impedance. When the first flexible connecting member 551 is used as a wire for transmitting a communication signal including an RF signal, in order to minimize the impedance change in the highly bendable section (e.g., the flex portions 551e and 552e), adjusting the width or thickness thereof may also be limited. According to an embodiment, the highly bendable section may refer to the flex portions 551e and 552e. For example, the flex portions 551e and 552e may be bent or flat depending on the use state of the electronic device 101.

Accordingly, according to various embodiments of the disclosure, an impedance matching unit (not illustrated) may be additionally included at least one end 551a or 551b of the first flexible connecting member 551. The at least one end 551a or 551b of the flexible connecting member 550 may correspond to a rigid portion of the flexible connecting member.

Hereinafter, in describing the flexible connecting member 550, the first flexible connecting member 551 in which a wire for transmitting a communication signal including an RF signal is formed will be mainly described.

Figure 7:
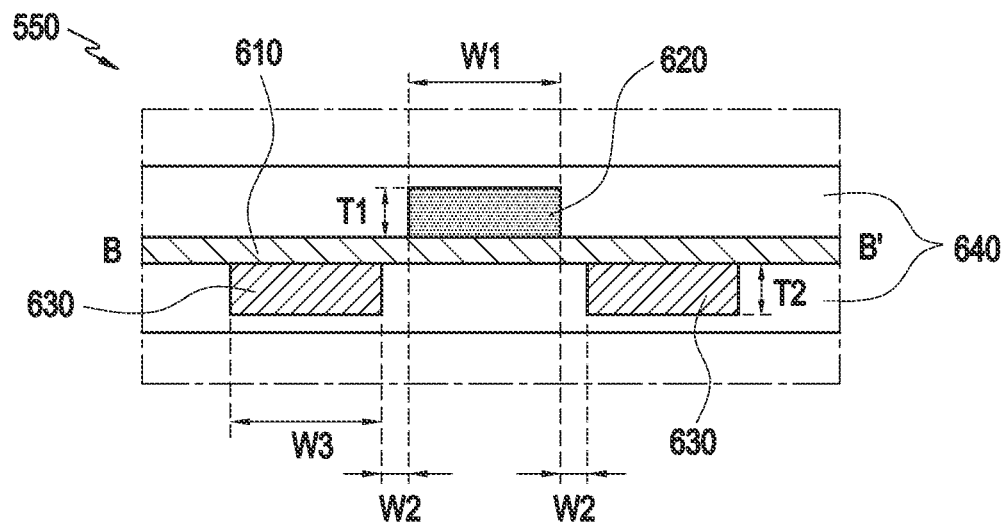
FIG. 7 is a cross-sectional view of an embodiment of a highly bendable section of a flexible connecting member, taken along B-B' according to an embodiment of the disclosure.

FIG. 7 is a cross-sectional view of an embodiment of a highly bendable section of a flexible connecting member, taken along B-B' according to an embodiment of the disclosure.

Figure 8:
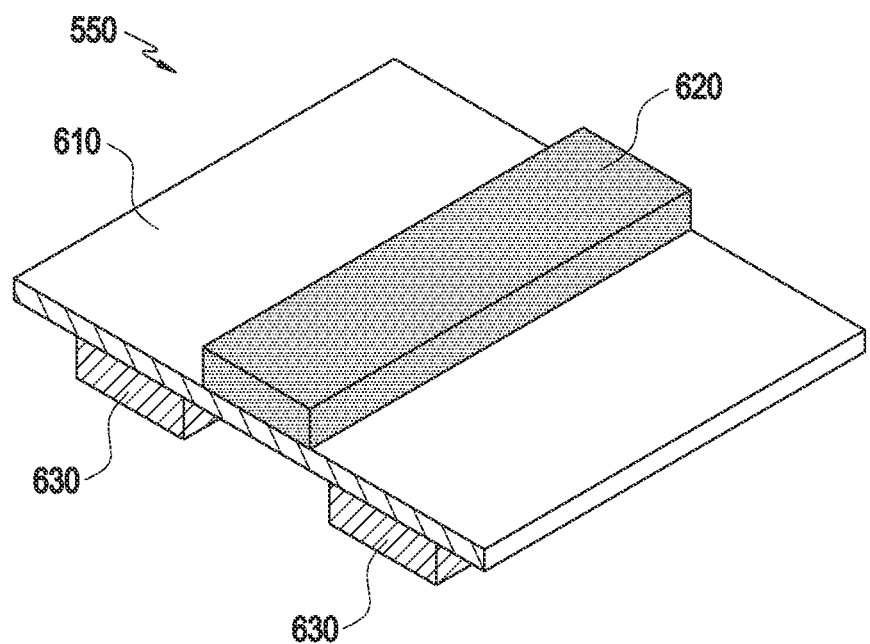
FIG. 8 is a cross-sectional perspective view of an embodiment of a highly bendable section of a flexible connecting member in a state in which coverlays are excluded according to an embodiment of the disclosure.

FIG. 8 is a cross-sectional perspective view of an embodiment of a highly bendable section of a flexible connecting member in a state in which coverlays are excluded according to an embodiment of the disclosure.

The flexible connecting member 550 illustrated in FIGS. 7 and 8 may be the same as or similar to the flexible connecting member 550 illustrated in FIGS. 5 and 6. Accordingly, a description of the same configuration may be omitted.

According to an embodiment, the highly bendable section of the flexible connecting member refers to the flex portions 551e and 552e illustrated in FIG. 6.

According to various embodiments, the flexible connecting member 550 includes a dielectric substrate 610, a signal wire 620, a ground 630, and a coverlay 640.

According to various embodiments, the dielectric substrate 610 may be configured in a plate shape. The dielectric substrate 610 may include polyimide and liquid crystal polymer (LCP) resins. The thickness of the dielectric substrate 610 may be about 10 μm to about 20 μm. According to an embodiment, the thickness of the dielectric substrate 610 may be about 12 μm.

According to various embodiments, a signal wire 620 is disposed on one surface of the dielectric substrate 610, and a ground 630 is disposed on the other surface of the dielectric substrate 610. For example, the dielectric substrate 610, the signal wire 620, and the ground 630 may be disposed at different positions in the vertical direction. Accordingly, the dielectric substrate 610 may be disposed between the signal wire 620 and the ground 630. According to an embodiment, coverlays 640 are disposed on both surfaces of the dielectric substrate 610. Accordingly, the dielectric substrate 610, the signal wire 620, and the ground 630 may be configured to be covered by the coverlays 640. As the dielectric substrate 610, the signal wire 620, and the ground 630 are configured to be covered by the coverlays 640, the dielectric substrate 610, the signal wire 620, and the ground 630 of the flexible connecting member 550 may be disposed on different layers.

Referring to FIGS. 7 and 8, according to various embodiments, the ground 630, the signal wire 620, and the ground 630 are disposed in the flexible connecting member 550 in this order from left to right. According to an embodiment, three components including the ground 630, the signal wire 620, and the ground 630 may form one set and may be arranged to be repeated. For example, the flexible connecting member 550 may include at least two grounds 630 disposed on the other surface of the dielectric substrate 610, and when viewed from above the dielectric substrate 610, the signal wire 620 may be disposed between the at least two grounds 630. According to another embodiment, in the flexible connecting member 550, the ground 630 and the signal wire 620 may be disposed in this order from left to right. The two components including the ground 630 and the signal wire 620 may form one set and may be arranged to be repeated.

According to various embodiments, the signal wire 620 is disposed on one surface of the dielectric substrate 610. The width W1 of the signal wire 620 may be about 150 μm to about 250 μm. According to an embodiment, the width W1 of the signal wire 620 may be about 200 μm. The thickness T1 of the signal wire 620 may be about 5 μm to about 20 μm. According to an embodiment, the thickness T1 of the signal wire 620 may be about 10 μm. The signal wire 620 may be formed of a metal. According to an embodiment, the signal wire 620 may include copper. Accordingly, the signal wire 620 may function as a conductor. The signal wire 620 disposed on the flexible connecting member 550 may be configured to connect an antenna module (e.g., the antenna module 470 in FIG. 4) and a printed circuit board (e.g., the printed circuit board 430 in FIG. 4) to each other.

According to various embodiments, the ground 630 is disposed on the other surface of the dielectric substrate 610. The width W3 of the ground 630 may be about 100 μm to about 300 μm. According to an embodiment, the width W3 of the ground 630 may be about 200 μm. The thickness T2 of the ground 630 may be about 5 μm to about 20 μm. According to an embodiment, the thickness T2 of the ground 630 may be about 10 μm. The ground 630 may be formed of a metal. According to an embodiment, the ground 630 may include copper. Accordingly, the ground 630 may function as a conductor. Since the signal wire 620 and the ground 630 are disposed to be spaced apart from each other in the vertical direction, the signal wire 620 and the ground 630 may be disposed on different layers. As the signal wire 620 and the ground 630 are disposed on different layers, it is possible to adjust the horizontal distance W2 between the signal wire 620 and the ground 630 adjacent thereto to be less than or equal to a predetermined value. The horizontal distance W2 between the ground 630 and the signal wire 620 adjacent thereto may be about 60 μm or less. According to an embodiment, the horizontal distance W2 between the ground 630 and the signal wire 620 adjacent thereto may be about 20 μm to about 30 μm. According to another embodiment, the horizontal distance W2 between the ground 630 and the signal wire 620 adjacent thereto may be 0 μm.

According to various embodiments, since the signal wire 620 and the ground 630 are made of a metal, the signal wire 620 and the ground 630 have capacitance. As the distance between the signal wire 620 and the ground 630 decreases, the capacitance may increase. In general, the characteristic impedance $Z_0$ of the flexible connecting member 550 is proportional to the square root of inductance and inversely proportional to the square root of capacitance. As the horizontal distance between the signal wire 620 adjacent to the ground 630 and the ground 630 is maintained at about 60 μm or less, the capacitance of the flexible connecting member 550 may increase. As the capacitance of the flexible connecting member 550 increases, the characteristic impedance $Z_0$ of the flexible connecting member 550 may be maintained at a predetermined value or less. According to an embodiment, the characteristic impedance $Z_0$ of the flexible connecting member 550 may be maintained at 50 ohms (Ω)

or less. As the characteristic impedance $Z_0$ of the flexible connecting member 550 is maintained at a predetermined value or less, signal loss due to the flexible connecting member 550 may be reduced.

According to various embodiments, the coverlays 640 of the flexible connecting member 550 are disposed on both surfaces of the dielectric substrate 610. The coverlays 640 may be disposed to cover the dielectric substrate 610, the signal wire 620, and the ground 630. The coverlays 640 may include polyimide and liquid crystal polymer (LCP) resins. The thickness of the coverlays 640 may be about 30 μm to about 60 μm.

FIG. 8 is a cross-sectional perspective view of an embodiment of the highly bendable section of a flexible connecting member in the state in which coverlays 640 are excluded according to an embodiment of the disclosure. According to an embodiment, the highly bendable section of the flexible connecting member may mean the flex portions 551e and 552e illustrated in FIG. 6.

Referring to FIG. 8, the structure of the flexible connecting member 550 can be more easily understood. Along the width direction of the flexible connecting member 550, a signal wire 620 is disposed on one surface of the dielectric substrate 610, and a ground 630 is disposed on the other surface of the dielectric substrate 610. Accordingly, the dielectric substrate 610, the signal wire 620, and the ground 630 may be disposed at different positions in the vertical direction.

An additional embodiment of the flexible connecting member 550 according to various embodiments will be described later with reference to FIGS. 16A to 16D.

Figure 9:
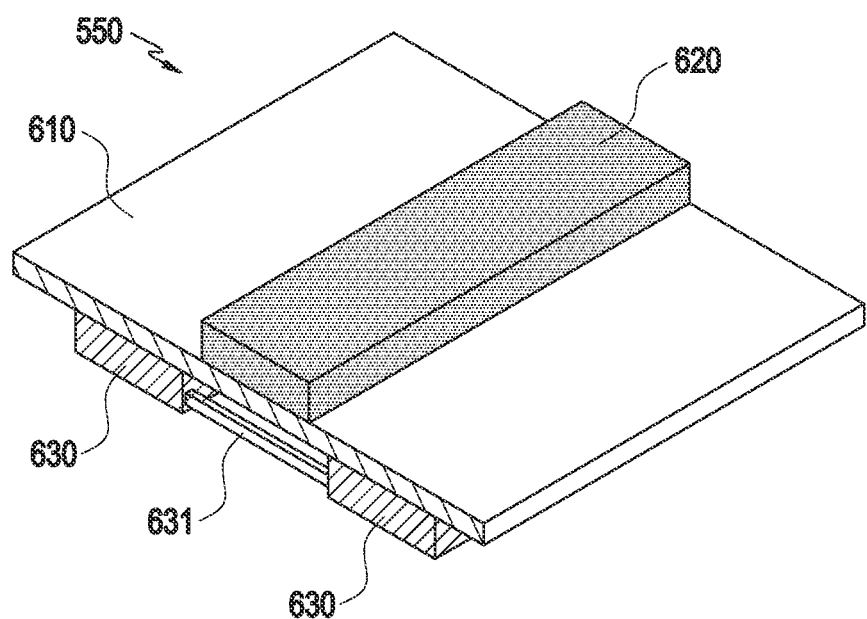
FIG. 9 is a cross-sectional perspective view of another embodiment of a highly bendable section of a flexible connecting member according to an embodiment of the disclosure.

FIG. 9 is a cross-sectional perspective view of another embodiment of the highly bendable section of the flexible connecting member according to an embodiment of the disclosure.

Figure 10:
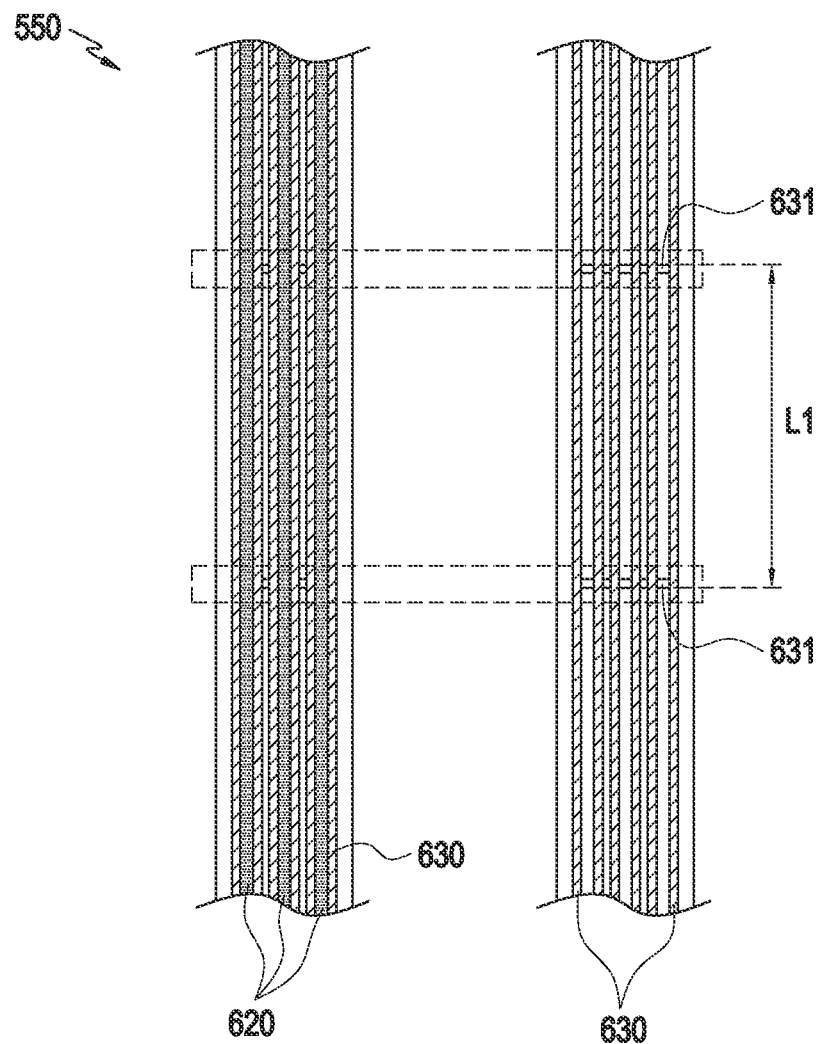
FIG. 10 is a top plan view of a highly bendable section of a flexible connecting member according to an embodiment of the disclosure.

FIG. 10 is a top plan view of a highly bendable section of a flexible connecting member according to an embodiment of the disclosure. As described above with reference to FIG. 8, the signal wire 620 and the ground 630 illustrated in FIG. 10 are disposed at different positions in the vertical direction. According to an embodiment, the signal wire 620 and the ground 630 may be disposed on different planes. According to an embodiment, the bridge 631 may be disposed on the same plane as the ground 630. According to an embodiment, the highly bendable section of the flexible connecting member may mean the flex portions 551e and 552e illustrated in FIG. 6.

The flexible connecting member 550 illustrated in FIGS. 9 and 10 may be the same as or similar to the flexible connecting member 550 illustrated in FIGS. 5 to 8. Accordingly, a description of the same configuration may be omitted.

According to the embodiments illustrated in FIGS. 9 and 10, the flexible connecting member 550 further includes a bridge 631. The bridge 631 may be configured to connect the adjacent grounds 630 to each other. The bridge 631 may be formed of a metal. According to an embodiment, the bridge 631 may include copper. Accordingly, the bridge 631 may be configured to energize two adjacent grounds 630. The bridge spacing L1 between the adjacent bridges 631 may be less than or equal to ½ or the wavelength λ of a predetermined frequency band. According to an embodiment, the bridge spacing L1 may be ¼ or less of the wavelength λ of the predetermined frequency band.

According to various embodiments, since the bridge 631 is configured to energize two adjacent grounds 630, a parasitic resonance phenomenon generated in the flexible connecting member 550 may be reduced. In addition, as the bridge 631 is disposed such that the bridge spacing L1 is maintained to be equal to or less than ½ of the wavelength λ of the predetermined frequency band, an interference phenomenon due to the proximity of the signal wire 620 and the ground 630 may be reduced. Furthermore, it is possible to reduce signal loss compared to a coplanar waveguide (CPW) method.

According to various embodiments, as the signal wire 620 and the ground 630 are disposed at different positions in the vertical direction, the bending performance of the flexible connecting member 550 may be improved. As the bending performance of the flexible connecting member 550 is improved, the amount of change in signal loss and the amount of change in resistance may be reduced. Accordingly, durability of the flexible connecting member 550 may be improved.

An additional embodiment of the flexible connecting member 550 according to various embodiments will be described later with reference to FIGS. 17A to 17D.

Figure 11:
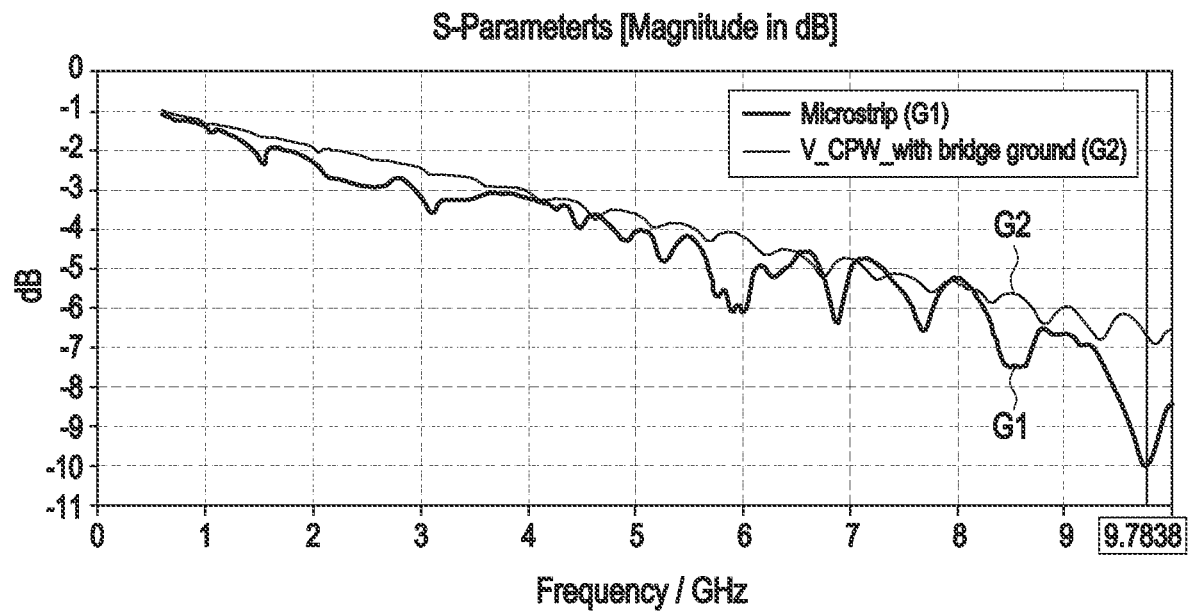
FIG. 11 illustrates graphs of an S-parameter of a flexible connecting member and an S-parameter of a microstrip structure according to a frequency according to an embodiment of the disclosure.

FIG. 11 illustrates graphs of an S-parameter of a flexible connecting member and an S-parameter of a microstrip structure according to a frequency according to an embodiment of the disclosure.

Referring to FIG. 11, the graphs relate to an S-parameter of the flexible connecting member 550 according to an embodiment of the disclosure. The values of the S-parameter of the microstrip structure are indicated by a thick line G1, and the values of the S-parameter for the flexible connecting member 550 are indicated by a thin line G2. The unit of the horizontal axis of the graph shown in FIG. 11 is frequency (GHz) of electromagnetic waves, and the unit of the vertical axis of the graph is decibel (dB). It can be understood that the smaller the value (dB) of the vertical axis at a specific frequency, the lower the performance at the specific frequency.

According to various embodiments, the S-parameter of the flexible connecting member 550 and the S-parameter of the microstrip structure has a value of about −1 dB at about 0.8 GHz. As the frequency increases, the difference between the value of the S-parameter of the flexible connecting member 550 and the value of the S-parameter of the microstrip structure may increase. For example, at the frequency of 3 GHz, the S-parameter of the flexible connecting member 550 may have a value of about −2.5 dB, and the S-parameter of the microstrip structure may have a value of about −3 dB. Accordingly, at the frequency of about 3 GHZ, a difference in values of the S-parameters may be about 0.5 dB.

According to various embodiments, at the frequency of about 6 GHZ, the S-parameter of the flexible connecting member 550 may have a value of about −4 dB, and the S-parameter for the microstrip structure may have a value of about −6 dB. Accordingly, at the frequency of about 6 GHZ, a difference in the values of the S-parameters may be about 2 dB.

According to various embodiments, at the frequency of about 9.7838 GHz, the S-parameter of the flexible connecting member 550 may have a value of about −7 dB, and the S-parameter for the microstrip structure may have a value of about −10 dB. Accordingly, at the frequency of about 9.7838 GHZ, a difference in the values of the S-parameters may be about 3 dB.

In this way, as the frequency increases, the difference between the value of the S-parameter of the flexible connecting member 550 and the value of the S-parameter of the microstrip structure may increase. As the frequency increases, the amount of decrease in the value of the S-parameter of the flexible connecting member 550 is small. Thus, when the flexible connecting member 550 is applied, signal loss may be reduced.

Figure 12:
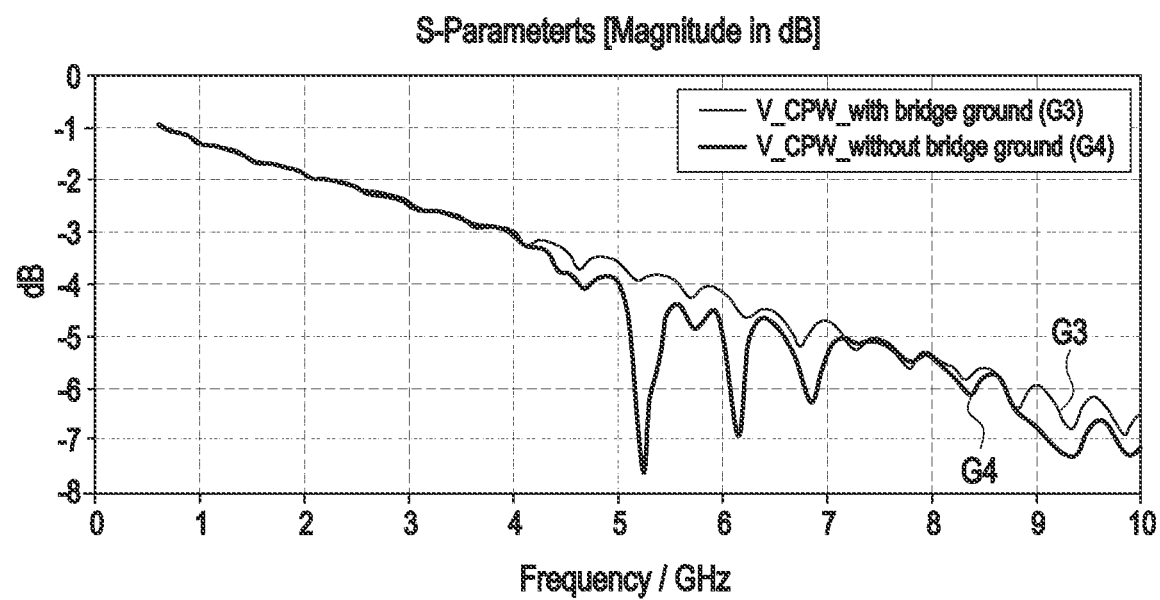
FIG. 12 illustrates graphs of an S-parameter of a flexible connecting member and an S-parameter of a flexible connecting member, to which a bridge is applied, according to a frequency, according to an embodiment of the disclosure.

FIG. 12 illustrates graphs of an S-parameter of a flexible connecting member and an S-parameter of a flexible connecting member, to which a bridge is applied, according to a frequency, according to an embodiment of the disclosure.

Referring to FIG. 12, the graphs relate to an S-parameter of a flexible connecting member 550 to which a bridge 631 is not applied and an S-parameter of the flexible connecting member 550 to which a bridge 631 is applied, according to various embodiments of the disclosure. The values of the S-parameter of the flexible connecting member 550 to which the bridge 631 is not applied is indicated by a thick line G4, and the values of the S-parameter of the flexible connecting member 550 to which the bridge 631 is applied is indicated by a thin line G3. The unit of the horizontal axis of the graph shown in FIG. 12 is frequency (GHz) of electromagnetic waves, and the unit of the vertical axis of the graph is decibel (dB). It can be understood that the smaller the value (dB) of the vertical axis at a specific frequency, the lower the performance at the specific frequency.

According to various embodiments, the flexible connecting member 550 to which the bridge 631 is not applied generates a resonance at a specific frequency. For example, in the flexible connecting member 550 to which the bridge 631 is not applied, resonance occurs at the frequencies of about 5.2 GHZ, about 6.2 GHz, about 6.8 GHz, about 9.4 GHz, and about 9.8 GHz, and thus the values of the S-parameter may decrease rapidly.

For example, referring to FIG. 12, the S-parameter of the flexible connecting member 550 to which the bridge 631 is not applied may have a value of about −7.8 dB at the frequency of about 5.2 GHZ, a value of about −7 dB at the frequency of about 6.2 GHz, a value of −6.3 dB at the frequency of about 6.8 GHZ, a value of about −7.3 dB at the frequency of about 9.4 GHz, and a value of about −7.3 dB at the frequency of about 9.8 GHz.

Referring back to FIG. 9, according to various embodiments, the values of the S-parameter of the flexible connecting member 550 to which the bridge 631 is applied may decrease relatively linearly as the frequency increases.

For example, referring to FIG. 12, the S-parameter of the flexible connecting member 550 to which the bridge 631 is applied may have a value of −1 dB at the frequency of about 0.8 GHz and a value of about −6.5 dB at the frequency of about 10 GHz.

According to various embodiments, the S-parameter values of the flexible connecting member 550 to which the bridge 631 is not applied may be rapidly reduced at the frequencies of about 5.2 GHz, about 6.2 GHZ, about 6.8 GHz, about 9.4 GHz, and about 9.8 GHz. In contrast, the S-parameter values of the flexible connecting member 550 to which the bridge 631 is applied may not rapidly decrease at the frequencies of about 5.2 GHz, about 6.2 GHz, about 6.8 GHz, about 9.4 GHz, and about 9.8 GHz.

For example, the S-parameter of the flexible connecting member 550 to which the bridge 631 is applied may have a value of about −4 dB at the frequency of about 5.2 GHz, a value of about −4.5 dB at the frequency of about 6.2 GHz, a value of about −5.1 dB at the frequency of about 6.8 GHZ, a value of about −6.7 dB at the frequency of about 9.4 GHz, and a value of about −6.8 dB at the frequency of about 9.8 GHz.

In this way, by applying the bridge 631, signal loss in the flexible connecting member 550 may be reduced.

Figure 13:
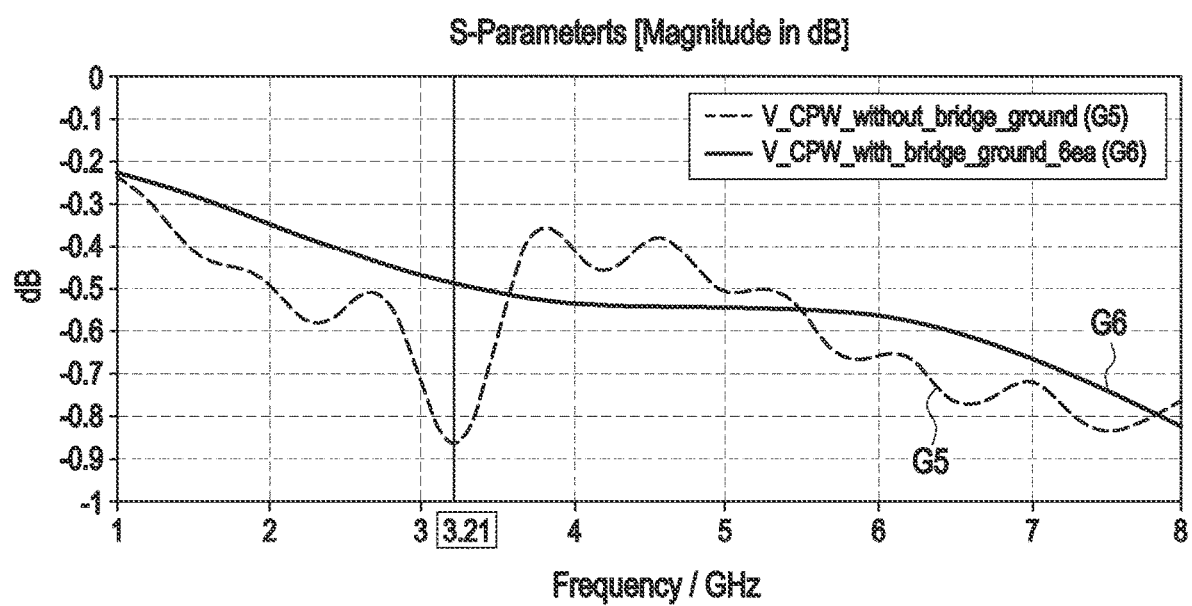
FIG. 13 illustrates graphs of an S-parameter of a flexible connecting member and an S-parameter of a flexible connecting member, to which a bridge is applied, according to a frequency, according to an embodiment of the disclosure.

FIG. 13 illustrates graphs of an S-parameter of a flexible connecting member and an S-parameter of a flexible connecting member, to which a bridge is applied, according to a frequency, according to an embodiment of the disclosure.

Referring to FIG. 13, the graphs relate to an S-parameter of a flexible connecting member 550 to which a bridge 631 is not applied and an S-parameter of the flexible connecting member 550 to which a bridge 631 is applied, according to various embodiments of the disclosure. The values of the S-parameter of the flexible connecting member 550 to which the bridge 631 is not applied is indicated by a dotted line G5, and the values of the S-parameter of the flexible connecting member 550 to which the bridge 631 is applied is indicated by a solid line G6. The unit of the horizontal axis of the graph shown in FIG. 13 is frequency (GHz) of electromagnetic waves, and the unit of the vertical axis of the graph is decibel (dB). It can be understood that the smaller the value (dB) of the vertical axis at a specific frequency, the lower the performance at the specific frequency.

According to various embodiments, the values of the S-parameter of the flexible connecting member 550 to which the bridge 631 is not applied may be affected by a surrounding conductor and may thus highly variable as the frequency increases.

For example, the S-parameter of the flexible connecting member 550 to which the bridge 631 is not applied may have a value of about −0.23 dB at the frequency of about 1 GHz, a value of about −0.86 dB at the frequency of about 3.21 GHz, a value of about −0.35 dB at the frequency of about 3.8 GHZ, a value of about −0.78 dB at the frequency of about 6.5 GHZ, and a value of about −0.77 dB at the frequency of about 8 GHz.

According to various embodiments, the S-parameter values of the flexible connecting member 550 to which the bridge 631 is applied may be less affected by a surrounding conductor. Accordingly, the S-parameter values of the flexible connecting member 550 to which the bridge 631 is applied may linearly decrease as the frequency increases.

For example, the S-parameter of the flexible connecting member 550 to which the bridge 631 is applied may have a value of about −0.23 dB at the frequency of about 1 GHz, a value of about −0.5 dB at the frequency of about 3.21 GHz, a value of about −0.52 dB at the frequency of about 3.8 GHZ, a value of about −0.6 dB at the frequency of about 6.5 GHZ, and a value of about −0.82 dB at the frequency of about 8 GHz.

Accordingly, the S-parameter values of the flexible connecting member 550 to which the bridge 631 is not applied may be highly variable due to the influence of a conductors disposed around the flexible connecting member 550. In contrast, the influence of a conductor disposed around the flexible connecting member 550 to which the bridge 631 is applied is reduced, and thus the S-parameter values of the flexible connecting member 550 to which the bridge 631 is applied may be less variable.

Figure 14:
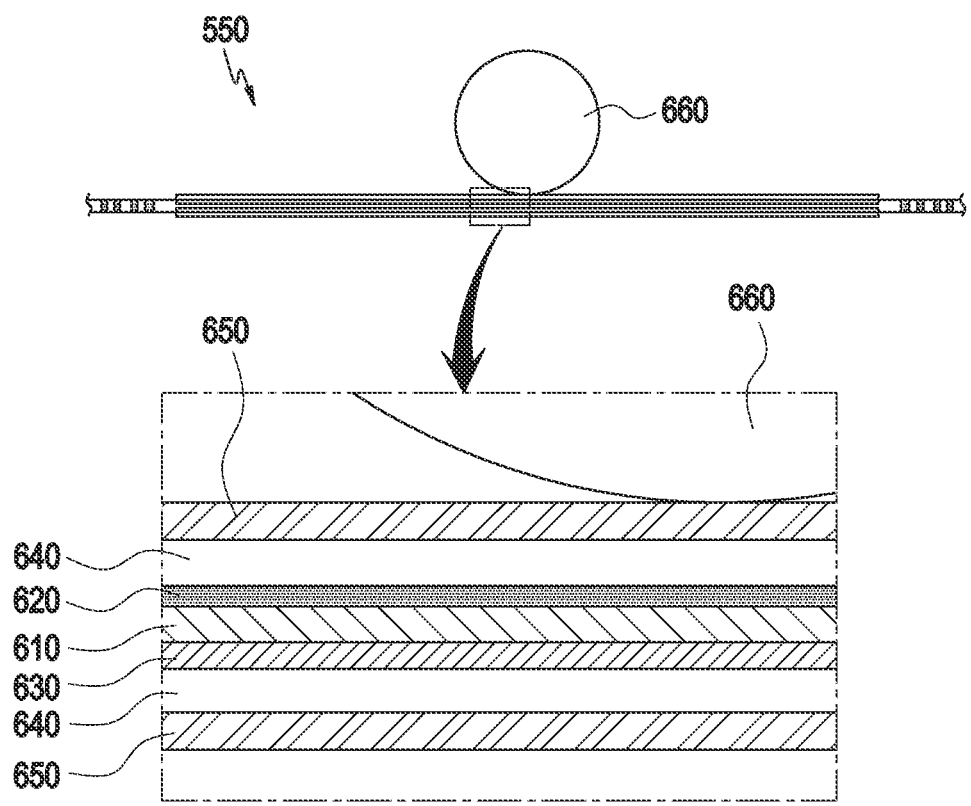
FIG. 14 is a cross-sectional view of an embodiment of a highly bendable section of a flexible connecting member according to an embodiment of the disclosure.

FIG. 14 is a cross-sectional view of an embodiment of a highly bendable section of a flexible connecting member according to an embodiment of the disclosure.

The dielectric substrate 610, the signal wire 620, the ground 630, and the coverlays 640 included in the flexible connecting member 550 illustrated in FIG. 14 may be the same as or similar to the dielectric substrate 610, the signal wire 620, the ground 630, and the coverlays 640 illustrated in FIGS. 7 to 10. Accordingly, a description of the same configuration may be omitted.

According to an embodiment, the highly bendable section of the flexible connecting member may mean the flex portions 551*e* and 552*e* illustrated in FIG. 6.

Referring to FIG. 14, according to various embodiments, a flexible connecting member 550 includes a dielectric substrate 610, a signal wire 620, a ground 630, coverlays 640, and first non-conductive members 650, and a hinge member 660.

According to various embodiments, the first non-conductive members 650 are formed of a material that does not conduct electricity. According to an embodiment, the first non-conductive members 650 may be formed of a foam tape. The first non-conductive members 650 may be disposed on the outer surfaces of the coverlays 640, respectively. According to an embodiment, the first non-conductive member 650 may be disposed to cover the outer surface of the coverlay 640 covering the signal wire 620. According to an embodiment, the first non-conductive member 650 may be disposed to cover the outer surface of the coverlay 640 covering the ground 630. In this way, since the first non-conductive members 650 are disposed to cover the outer surfaces of the coverlays 640, the flexible connecting member 550 may be disposed to be spaced apart from other components. Since the flexible connecting member 550 is disposed to be spaced apart from other components (e.g., conductors), interference caused in the flexible connecting member 550 due to a conductor (e.g., a hinge member 660) disposed adjacent to the flexible connecting member 550 may be reduced.

According to various embodiments, the hinge member 660 is disposed between a first housing (e.g., the first housing 421 in FIG. 4) and a second housing (e.g., the second housing 422 in FIG. 4) included in the foldable housing (e.g., the foldable housing 420 in FIG. 4). According to an embodiment, the first housing 421 and the second housing 422 are movable relative to each other. The hinge structure 440 (e.g., the hinge structure 440 in FIG. 4) may be configured to support the foldable housing 420 and/or the bracket assemblies 423 and 424 such that the foldable housing 420 is rotatable about a folding axis (e.g., A-A' in FIG. 2). The hinge member 660 may be a member included in the hinge structure 440. Accordingly, the first housing 421 and the second housing 422 are rotatable about the hinge member 660 while moving relative to each other.

According to various embodiments, the hinge member 660 is disposed adjacent to the flexible connecting member 550. According to an embodiment, the hinge member 660 is disposed adjacent to a highly bendable section of the flexible connecting member 550. According to an embodiment, the highly bendable section of the flexible connecting member may mean the flex portions 551*e* and 552*e* illustrated in FIG. 6. As the hinge member 660 is disposed adjacent to the highly bendable section of the flexible connecting member 550, the flexible connecting member 550 may be bent in contact with the outer surface of the hinge member 660. As the flexible connecting member 550 is bent in contact with the outer surface of the hinge member 660, it is possible to prevent a portion of the flexible connecting member 550 from being excessively bent. Therefore, durability of the flexible connecting member 550 may be improved. According to an embodiment, the hinge member 660 may have a cylindrical shape.

Figure 15:
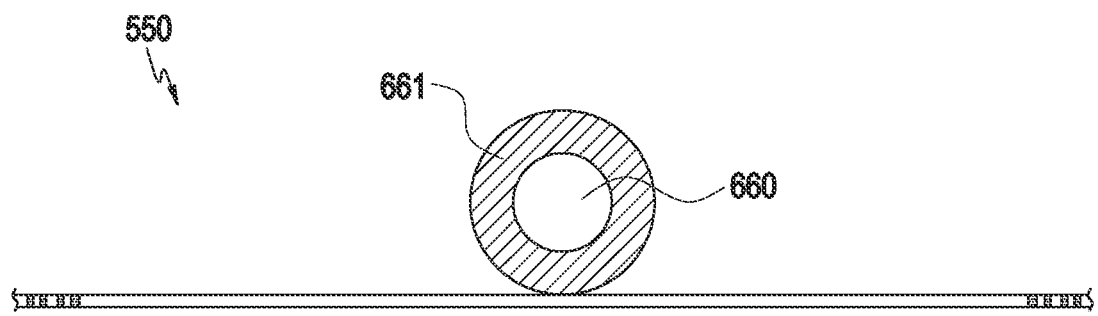
FIG. 15 is a cross-sectional view of another embodiment of a highly bendable section of a flexible connecting member according to an embodiment of the disclosure.

FIG. 15 is a cross-sectional view of another embodiment of the highly bendable section of the flexible connecting member according to an embodiment of the disclosure.

The flexible connecting member 550 and the hinge member 660 illustrated in FIG. 15 may be the same as or similar to the flexible connecting member 550 illustrated in FIGS. 7 to 10, and 14 and the hinge member 660 illustrated in FIG. 14. Accordingly, a description of the same configuration may be omitted. According to an embodiment, the highly bendable section of the flexible connecting member may mean the flex portions 551*e* and 552*e* illustrated in FIG. 6.

Referring to FIG. 15, according to various embodiments, the hinge member 660 is disposed adjacent to the flexible connecting member 550. According to an embodiment, the second non-conductive member 661 may be disposed on the outer surface of the hinge member 660. The second non-conductive members 661 may be formed of a material that does not conduct electricity. According to an embodiment, the second non-conductive member 661 may be made of plastic.

According to various embodiments, although not illustrated in FIG. 15, first non-conductive members (e.g., the first non-conductive members 650 in FIG. 14) may be disposed to cover the outer surfaces of the coverlays 640 of the flexible connecting member 550. In this way, since the first non-conductive members 650 are disposed to cover the outer surfaces of the coverlays 640, the flexible connecting member 550 may be disposed to be spaced apart from other components. Therefore, interference generated in the flexible connecting member 550 due to a conductor (e.g., the hinge member 660) disposed adjacent to the flexible connecting member 550 may be reduced.

According to various embodiments, since the second non-conductive member 661 is disposed outside the hinge member 660, the hinge member 660 and the flexible connecting member 550 may be disposed to be spaced apart from each other. Since the hinge member 660 and the flexible connecting member 550 are disposed to be spaced apart from each other, interference generated in the flexible connecting member 550 due to the hinge member 660 disposed adjacent to the flexible connecting member 550 may be reduced.

FIGS. 16A to 16D are cross-sectional views of an embodiment of a highly bendable section of a flexible connecting member, taken along B-B', in the state in which the coverlays are excluded according to various embodiments of the disclosure.

In the state in which the coverlays (e.g., the coverlays 640 in FIG. 7) illustrated in FIGS. 16A to 16D are excluded, the dielectric substrate 610, the signal wires 620, and the grounds 630 of the flexible connecting member (e.g., the flexible connecting member 550 in FIG. 7) may be the same as or similar to the dielectric substrates 610, the signal wires 620, and the grounds 630 illustrated in FIGS. 7 to 10, 14, and 15. Accordingly, a description of the same configuration may be omitted.

Figure 16A:
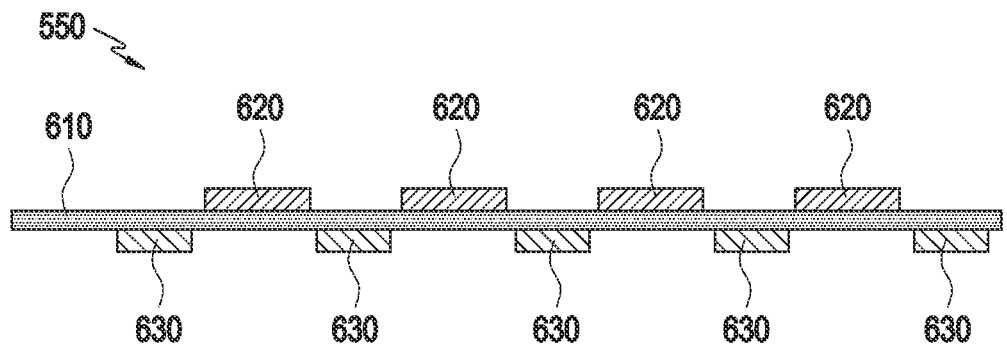
FIGS. 16A, 16B, 16C, and 16D are cross-sectional views of an embodiment of a highly bendable section of a flexible connecting member, taken along B-B', in a state in which coverlays are excluded according to an embodiment of the disclosure.

Referring to FIG. 16A, according to various embodiments, a plurality of signal wires 620 are disposed on one side of the dielectric substrate 610 to be spaced apart from each other. According to an embodiment, a plurality of grounds 630 are disposed on the other side of the dielectric substrate 610 to be spaced apart from each other. When the dielectric substrate 610 is viewed from above (when viewed in a plan view), the signal wires 620 and the grounds 630 may be disposed so as not to overlap each other, and the signal wires 620 and the grounds 630 may be arranged to be alternately repeated. As the signal wires 620 and the grounds 630 are arranged to be alternately repeated, noise and interference generated in the signal wires 620 may be reduced.

Figure 16B:
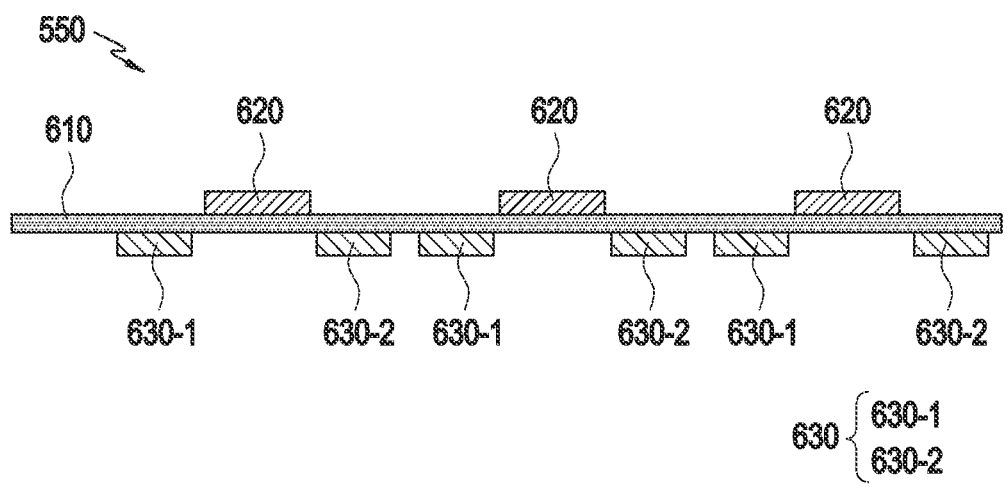

Referring to FIG. 16B, according to various embodiments, a plurality of signal wires 620 are disposed on one side of the dielectric substrate 610 to be spaced apart from each other. According to an embodiment, a plurality of grounds 630 are disposed on the other side of the dielectric substrate 610 to be spaced apart from each other. According to an embodiment, the grounds 630 include first grounds 630-1 and second grounds 630-2.

According to various embodiments, three components including a first ground 630-1 disposed on the other side of the dielectric substrate 610, a signal wire 620 located adjacent to the first ground 630-1 and disposed on the one side of the dielectric substrate 610, and a second ground 630-2 located adjacent to the signal wire 620 disposed on the one side of the dielectric substrate 610 and disposed on the other side of the dielectric substrate 610 form one set. The one set formed as described above may be arranged to be repeated on the dielectric substrate 610. According to an embodiment, when the dielectric substrate 610 is viewed from above (when viewed in a plan view), the set may be arranged to be repeated in the form of: the first ground 630-1, the signal wire 620, the second ground 630-2, and the first ground 630-1, the signal wire 620, and the second ground 630-2. As the two grounds 630 and the signal wire 620 disposed therebetween are arranged to be repeated, noise and interference generated in the signal wires 620 may be reduced.

Figure 16C:
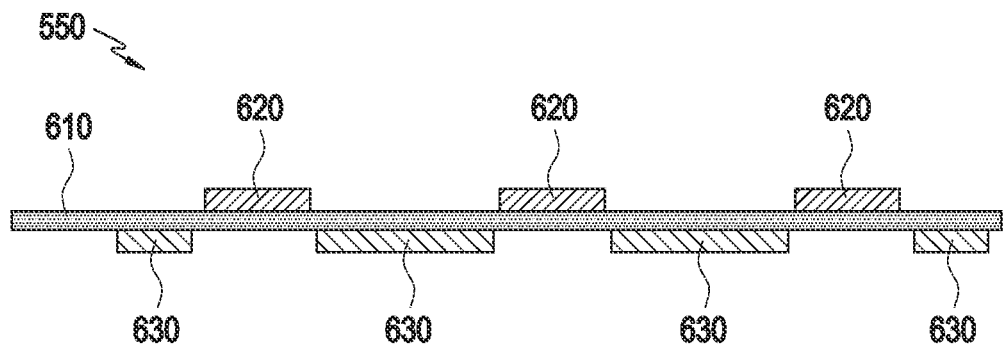

Referring to FIG. 16C, according to various embodiments, a plurality of signal wires 620 are disposed on one side of the dielectric substrate 610 to be spaced apart from each other. According to an embodiment, a plurality of grounds 630 are disposed on the other side of the dielectric substrate 610 to be spaced apart from each other. When the dielectric substrate 610 is viewed from above (when viewed in a plan view), the signal wires 620 and the grounds 630 may be disposed so as not to overlap each other, and the signal wires 620 and the grounds 630 may be arranged to be alternately repeated. According to an embodiment, a ground 630 disposed between adjacent signal wires 620 may be formed to have a wider width than another ground 630. Since the width of the ground 630 disposed between the adjacent signal wires 620 is formed to be wide, noise and interference generated in the signal wires 620 may be reduced.

Figure 16D:
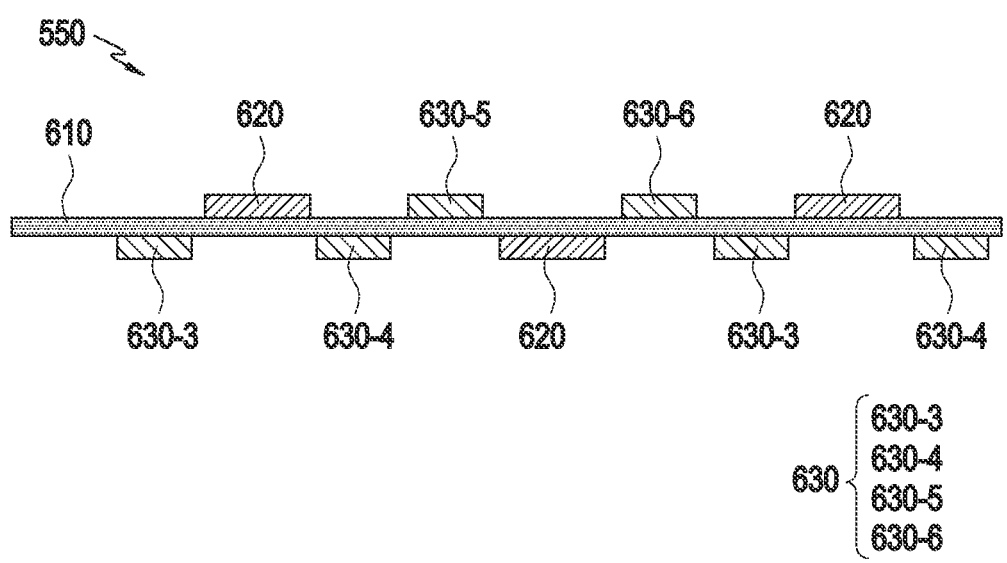

Referring to FIG. 16D, according to various embodiments, a plurality of signal wires 620 and a plurality of grounds 630 are disposed to be spaced apart from each other on one side and the other side of the dielectric substrate 610.

According to an embodiment, the grounds 630 include third grounds 630-3, fourth grounds 630-4, a fifth ground 630-5, and a sixth ground 630-6.

According to various embodiments, six components including a third ground 630-3 disposed on the other side of the dielectric substrate 610, a signal wire 620 located adjacent to the third ground 630-3 and disposed on the one side of the dielectric substrate 610, a fourth ground 630-4 located adjacent to the signal wire 620 disposed on the one side of the dielectric substrate 610 and disposed on the other side of the dielectric substrate 610, the fifth ground 630-5 located adjacent to the fourth ground 630-4 and disposed on the one side of the dielectric substrate 610, a signal wire 620 located adjacent to the fifth ground 630-5 and disposed on the other side of the dielectric substrate 610, and the sixth ground 630-6 located adjacent to the signal wire 620 disposed on the other side of the dielectric substrate 610 and disposed on the one side of the dielectric substrate 610 form one set. The one set formed as described above may be arranged to be repeated on the dielectric substrate 610. According to an embodiment, when the dielectric substrate 610 is viewed from above (when viewed in a plan view), the set may be arranged to be repeated in the form of: the third ground 630-3, the signal wire 620, the fourth ground 630-4, the fifth ground 630-5, the signal wire 620, and the sixth ground 630-6. With this arrangement, noise and interference generated in the signal wires 620 may be reduced.

FIGS. 17A to 17D are cross-sectional views of an embodiment of a highly bendable section of a flexible connecting member, taken along B-B', in the state in which the coverlays are excluded according to various embodiments of the disclosure.

In the state in which the coverlays (e.g., the coverlays 640 in FIG. 7) illustrated in FIGS. 17A to 17D are excluded, the dielectric substrate 610, the signal wires 620, the grounds 630, and the bridges 631 of the flexible connecting member (e.g., the flexible connecting member 550 in FIG. 7) may be the same as or similar to the dielectric substrates 610, the signal wires 620, the grounds 630, and the bridges 631 illustrated in FIGS. 7 to 10, 14, 15, and 16A to 16D. Accordingly, a description of the same configuration may be omitted.

Figure 17A:
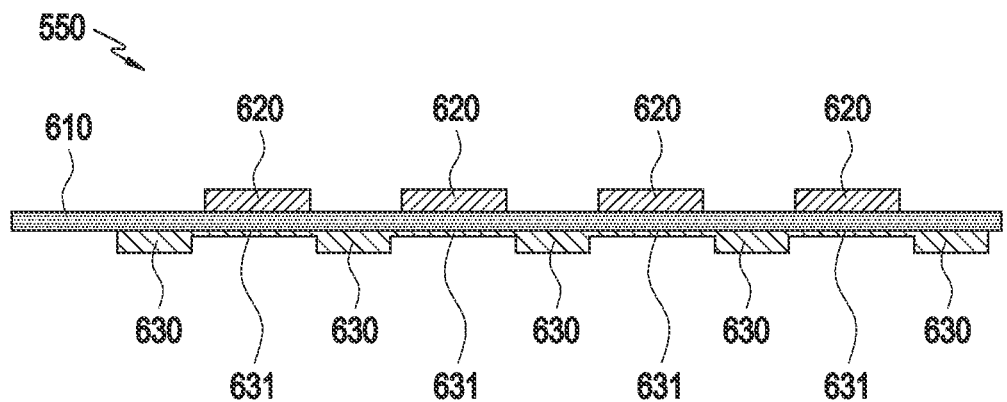
FIGS. 17A, 17B, 17C, and 17D are cross-sectional views of an embodiment of a highly bendable section of a flexible connecting, taken along B-B', in a state in which coverlays are excluded according to an embodiment of the disclosure.

Referring to FIG. 17A, according to various embodiments, a plurality of signal wires 620 are disposed on one side of the dielectric substrate 610 to be spaced apart from each other. According to an embodiment, a plurality of grounds 630 are disposed on the other side of the dielectric substrate 610 to be spaced apart from each other. Bridges 631 may each be disposed between the grounds 630 so as to connect the adjacent grounds 630 to each other. When the dielectric substrate 610 is viewed from above (when viewed in a plan view), the signal wires 620 and the grounds 630 may be disposed so as not to overlap each other, and the signal wires 620 and the grounds 630 may be arranged to be alternately repeated. As the signal wire 620 and the ground 630 are arranged to be alternately repeated, and the bridges 631 are arranged to connect the adjacent grounds 630, respectively, noise and interference generated in the signal wire 620 may be reduced.

Figure 17B:
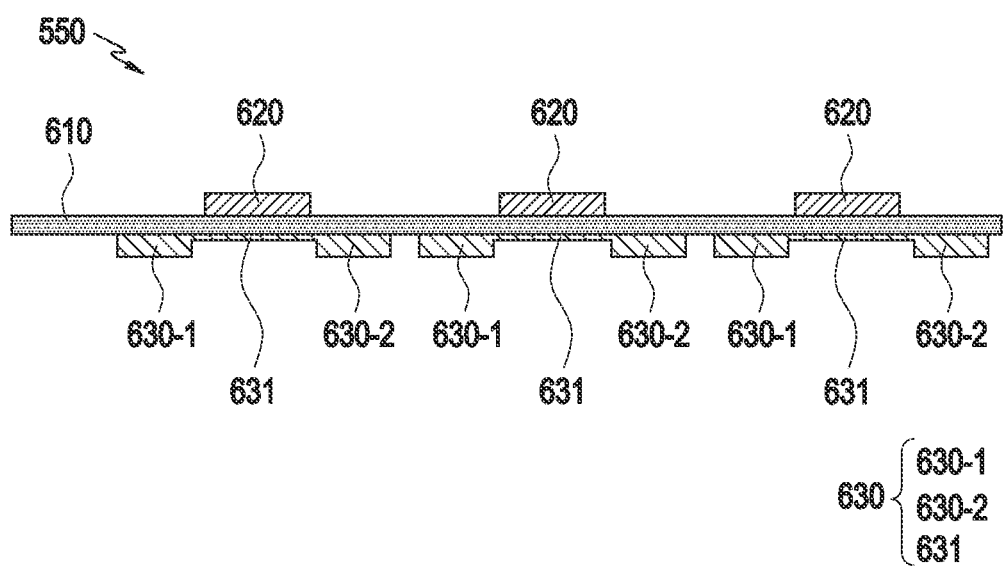

Referring to FIG. 17B, according to various embodiments, a plurality of signal wires 620 are disposed on one side of the dielectric substrate 610 to be spaced apart from each other. According to an embodiment, a plurality of grounds 630 are disposed on the other side of the dielectric substrate 610 to be spaced apart from each other. According to an embodiment, the grounds 630 include first grounds 630-1 and second grounds 630-2. Each bridge 631 may be disposed between a first ground 630-1 and a second ground 630-2. Each bridge 631 may be disposed to connect a first ground 630-1 and a second ground 630-2.

According to various embodiments, components including a first ground 630-1 disposed on the other side of the dielectric substrate 610, a signal wire 620 located adjacent to the first ground 630-1 and disposed on the one side of the dielectric substrate 610, a second ground 630-2 located adjacent to the signal wire 620 and disposed on the other side of the dielectric substrate 610, and a bridge 631 connecting the first ground 630-1 and the second ground 630-2 to each other form one set. The one set formed as described above may be arranged to be repeated on the dielectric substrate 610. According to an embodiment, when the dielectric substrate 610 is viewed from above (when viewed in a plan view), the set may be arranged to be repeated in the form of: the first ground 630-1, the signal wire 620, the second ground 630-2, the first ground 630-1, the signal wire 620, and the second ground 630-2. Since two grounds 630 and the signal wire 620 disposed therebetween are arranged to be repeated, and two grounds 630-1 and 630-2 are connected by a bridge 631, noise and interference generated in the signal wires 620 may be reduced.

Figure 17C:
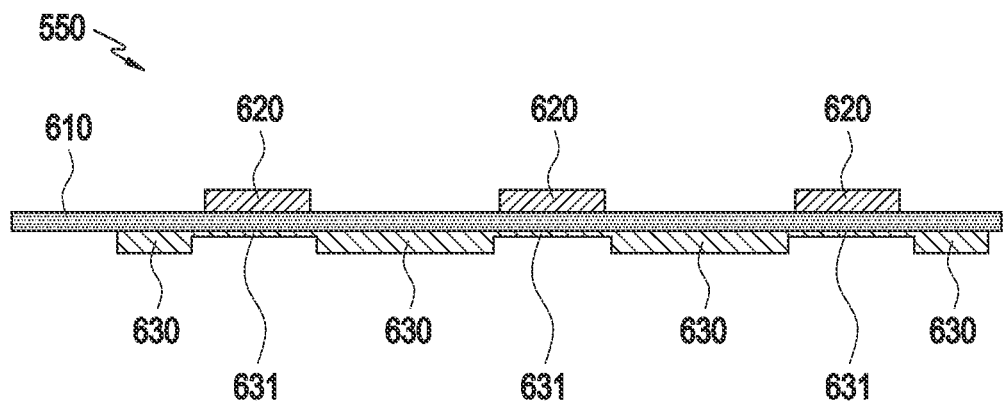

Referring to FIG. 17C, according to various embodiments, a plurality of signal wires 620 are disposed on one side of the dielectric substrate 610 to be spaced apart from each other. According to an embodiment, a plurality of grounds 630 are disposed on the other side of the dielectric substrate 610 to be spaced apart from each other. The adjacent grounds 630 may be connected to each other by a bridge 631. When the dielectric substrate 610 is viewed from above (when viewed in a plan view), the signal wires 620 and the grounds 630 may be disposed so as not to overlap each other, and the signal wires 620 and the grounds 630 may be arranged to be alternately repeated. According to an embodiment, a ground 630 disposed between adjacent signal wires 620 may be formed to have a wider width than another ground 630. Since the width of a ground 630 disposed between adjacent signal wires 620 is formed to be wide and the adjacent grounds 630 is connected by the bridge 631, noise and interference generated in the signal wires 620 may be reduced.

Figure 17D:
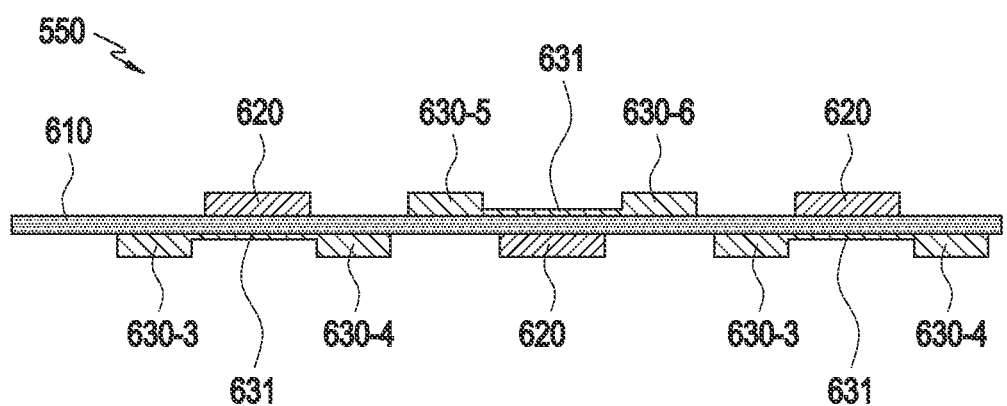

Referring to FIG. 17D, according to various embodiments, a plurality of signal wires 620 and a plurality of grounds 630 are disposed to be spaced apart from each other on one side and the other side of the dielectric substrate 610.

According to an embodiment, the grounds 630 include third grounds 630-3, fourth grounds 630-4, a fifth ground 630-5, and a sixth ground 630-6.

According to an embodiment, a bridge 631 is disposed between a third ground 630-3 and a fourth ground 630-4, and a bridge 631 may be disposed between the fifth ground 630-5 and the sixth ground 630-6. The bridges 631 may be disposed to connect the third ground 630-3 and the fourth ground 630-4, and to connect the fifth ground 630-5 and the sixth ground 630-6, respectively.

According to various embodiments, components including a third ground 630-3 disposed on the other side of the dielectric substrate 610, a signal wire 620 located adjacent to the third ground 630-3 and disposed on the one side of the dielectric substrate 610, a fourth ground 630-4 located adjacent to the signal wire 620 disposed on the one side of the dielectric substrate 610 and disposed on the other side of the dielectric substrate 610, the fifth ground 630-5 located adjacent to the fourth ground 630-4 and disposed on the one side of the dielectric substrate 610, a signal wire 620 located adjacent to the fifth ground 630-5 and disposed on the other side of the dielectric substrate 610, and the sixth ground 630-6 and the bridge 631 located adjacent to the signal wire 620 disposed on the other side of the dielectric substrate 610 and disposed on the one side of the dielectric substrate 610 form one set. The one set formed as described above may be arranged to be repeated on the dielectric substrate 610. According to an embodiment, when the dielectric substrate 610 is viewed from above (when viewed in a plan view), the set may be arranged to be repeated in the form of: the third ground 630-3, the signal wire 620, the fourth ground 630-4, the fifth ground 630-5, the signal wire 620, and the sixth ground 630-6. With this arrangement, as the bridges 631 are disposed to connect the grounds 630, noise and interference generated in the signal wires 620 may be reduced.

FIGS. 18A to 18D are plan views of grounds and bridges according to various embodiments of the disclosure.

The grounds 630 and the bridges 631 illustrated in FIGS. 18A to 18D may be the same as or similar to the grounds 630 and the bridges 631 illustrated in FIGS. 7 to 15, 16A to 16D, and 17A to 17D. Accordingly, a description of the same configuration may be omitted.

In the configurations illustrated in FIGS. 18A to 18D, other configurations such as the dielectric substrate (e.g., the dielectric substrate 610 in FIG. 17D) and the signal wires 620 may be omitted for convenience of description. Accordingly, embodiments that further include configurations other than those illustrated in FIGS. 18A to 18D are not excluded.

According to various embodiments of the disclosure, a plurality of grounds 630 are disposed on one side and/or the other side of a dielectric substrate (e.g., the dielectric substrate 610 in FIG. 17D) to be spaced apart from each other. A plurality of bridges 631 may be disposed between the grounds 630 to be spaced apart from each other. Bridges 631 may each be disposed between the grounds 630 so as to connect the adjacent grounds 630 to each other.

Figure 18A:
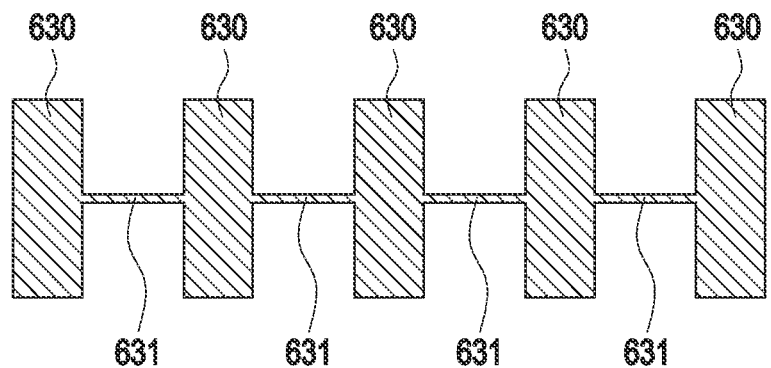
FIGS. 18A, 18B, 18C, and 18D are plan views of grounds and bridges according to an embodiment of the disclosure.

Referring to FIG. 18A, according to various embodiments, bridges 631 are disposed at central portions of grounds 630 in the longitudinal direction of the grounds 630. As the bridges 631 are disposed to connect the adjacent grounds 630, noise and interference generated in the signal wires 620 may be reduced.

Figure 18B:
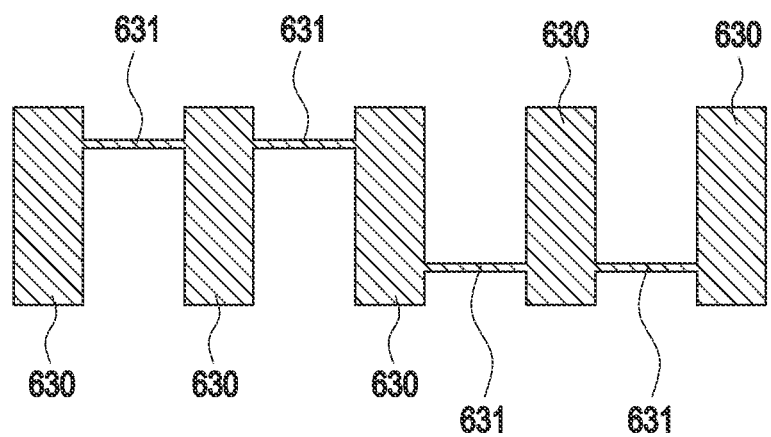

Referring to FIG. 18B, according to various embodiments of the disclosure, bridges 631 are disposed at the upper portions and/or the lower portions of grounds 630 in the longitudinal direction of the grounds 630. According to an embodiment, among the four bridges 631 disposed between five grounds 630, the left two bridges 631 are disposed at the upper ends, and the right two bridges 631 are disposed at the lower ends. As the bridges 631 are disposed to connect the adjacent grounds 630, noise and interference generated in the signal wires 620 may be reduced.

Figure 18C:
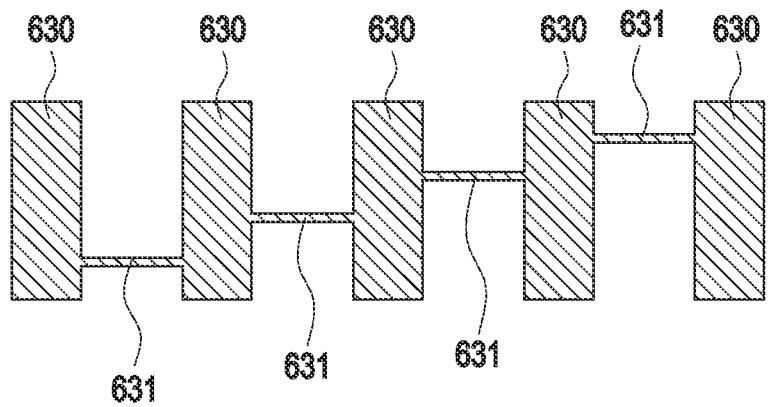

Referring to FIG. 18C, according to various embodiments of the disclosure, bridges 631 are disposed at various positions in longitudinal direction of grounds 630. According to an embodiment, the first bridge 631 from the left among the four bridges 631 disposed between the five grounds 630 are disposed at the lowermost portion, and the second bridge 631 from the left may be disposed higher than the first bridge 631 from the left, the third bridge 631 from the left are disposed higher than the second bridge 631 from the left, and the fourth bridge 631 from the left are disposed higher than the third bridge 631 and may be disposed at the uppermost portion.

According to another embodiment, the first bridge 631 from the left among the four bridges 631 disposed between the five grounds 630 may be disposed at the uppermost portion, and the second bridge 631 from the left may be disposed lower than the first bridge 631 from the left, the third bridge 631 from the left may be disposed lower than the second bridge 631 from the left, and the fourth bridge 631 from the left may be disposed lower than the third bridge 631 and may be disposed at the lowermost portion.

As the bridges 631 are disposed to connect the adjacent grounds 630, noise and interference generated in the signal wires 620 may be reduced.

Figure 18D:
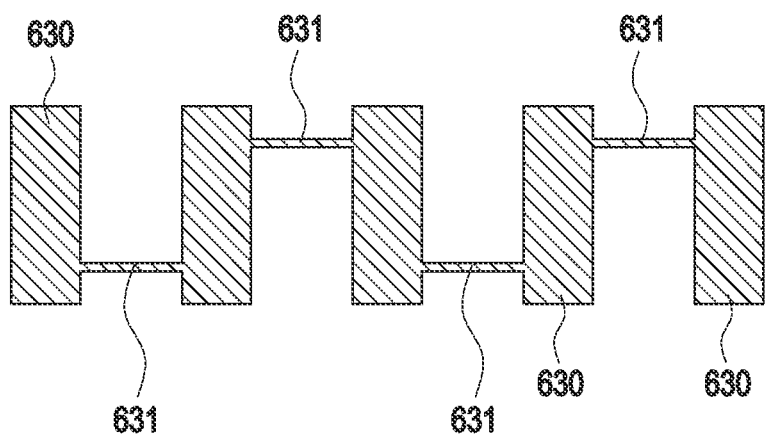

Referring to FIG. 18D, according to various embodiments of the disclosure, bridges 631 are disposed at the upper portions and/or the lower portions of grounds 630 in the longitudinal direction of the grounds 630. According to an embodiment, the first bridge 631 and the third bridge 631 from the left among the four bridges 631 disposed between the five grounds 630 are disposed at the lower portions, and the second bridge 631 and the fourth bridge 631 from the left are disposed at the upper portions.

According to another embodiment, the first bridge 631 and the third bridge 631 from the left among the four bridges 631 disposed between the five grounds 630 may be disposed at the upper portions, and the second bridge 631 and the fourth bridge 631 from the left may be disposed at the lower portions.

As the bridges 631 are disposed to connect the adjacent grounds 630, noise and interference generated in the signal wires 620 may be reduced.

FIGS. 18A to 18D illustrate that five grounds 630 are disposed, but the number of grounds 630 is not limited to five. Embodiments in which two or more grounds 630 are disposed may be included.

According to various embodiments of the disclosure, the flexible connecting members 550 illustrated in FIGS. 5 to 15, 16A to 16D, 17A to 17D, and 18A to 18D may be applicable not only to a foldable electronic device 101, but also to an electronic device 101 including a rollable display. Like a foldable electronic device, the shape of the housing of an electronic device 101 including a rollable display may not be fixed. An electronic device 101 including a rollable display having a variable housing shape may include the flexible connecting members 550 illustrated in FIGS. 5 to 15, 16A to 16D, 17A to 17D, and 18A to 18D. Accordingly, the flexible connecting members 550 may be mounted inside a variable housing of an electronic device 101 including a rollable display, and the above-described effects of the flexible connecting members 550 may be implemented in the same manner.

According to various embodiments of the disclosure, an electronic device (e.g., the electronic device 101 in FIG. 2) includes a housing (e.g., the foldable housing 300 in FIG. 2), and a flexible connecting member (e.g., the flexible connecting member 550 in FIG. 7) disposed inside the housing, the flexible connecting member including a dielectric substrate (e.g., the dielectric substrate 610 in FIG. 7), at least one signal wire (e.g., the signal wire 620 in FIG. 7) disposed on one surface of the dielectric substrate, and at least one ground (e.g., the ground 630 in FIG. 7) disposed on the other surface of the dielectric substrate adjacent to the signal wire. The at least one signal wire and the at least one ground may be disposed to be spaced apart from each other when viewed from above the dielectric substrate.

According to various embodiments, the flexible connecting member may further include a coverlay (e.g., the coverlay 640 in FIG. 7) disposed to cover the signal wire, the ground, and the dielectric substrate.

According to various embodiments, the horizontal distance (e.g., the horizontal distance W2 in FIG. 7) between the ground adjacent to the signal wire and the signal wire may be less than or equal to 60 μm.

According to various embodiments, the signal wire may have a width (e.g., the width W1 in FIG. 7) of 200 μm or less.

According to various embodiments, the flexible connecting member may include at least two grounds disposed on the other surface of the dielectric substrate, and the signal wire may be disposed between the at least two grounds when viewed from above the dielectric substrate.

According to various embodiments, the flexible connecting member may include at least one bridge (e.g., the bridge 631 in FIG. 9) disposed between the at least two grounds, and the bridge may be configured to connect the at least two grounds to each other.

According to various embodiments, the flexible connecting member may include at least two bridges, and the spacing between the at least two bridges may be less than or equal to ½ of a predetermined frequency wavelength.

According to various embodiments, the dielectric substrate may have a thickness of 10 μm to 20 μm.

According to various embodiments, the flexible connecting member may have an impedance of 50Ω or less.

According to various embodiments, the signal wire and the ground may include metal.

According to various embodiments, a first non-conductive member (e.g., the first non-conductive member 650 in FIG. 14) may be disposed on the outer surface of the coverlay.

According to various embodiments, the electronic device may further include a hinge member (e.g., the hinge member 660 in FIG. 14).

According to various embodiments, a second non-conductive member (e.g., the second non-conductive member 661 in FIG. 15) may be disposed on the outer surface of the hinge member.

According to various embodiments of the disclosure, a flexible connecting member (e.g., the flexible connecting member 550 in FIG. 7) includes a dielectric substrate (e.g., the dielectric substrate 610 in FIG. 7), at least one signal wire (e.g., the signal wire 620 in FIG. 7) disposed on one surface of the dielectric substrate, and at least one ground (e.g., the ground 630 in FIG. 7) disposed on the other surface of the dielectric substrate adjacent to the signal wire. The at least one signal wire and the at least one ground may be disposed to be spaced apart from each other when viewed from above the dielectric substrate.

According to various embodiments, the flexible connecting member may further include a coverlay (e.g., the coverlay 640 in FIG. 7) disposed to cover the signal wire, the ground, and the dielectric substrate.

According to various embodiments, the horizontal distance (e.g., the horizontal distance W2 in FIG. 7) between the ground adjacent to the signal wire and the signal wire may be less than or equal to 60 μm.

According to various embodiments, the width of the signal wire (e.g., the width W1 in FIG. 7) may be 200 μm or less.

According to various embodiments, the flexible connecting member may further include at least two grounds disposed on the other surface of the dielectric substrate, and the signal wire may be disposed between the at least two grounds when viewed from above the dielectric substrate.

According to various embodiments, the flexible connecting member may further include at least one bridge (e.g., the bridge 631 in FIG. 9) disposed between the at least two grounds, and the bridge may be configured to connect the at least two grounds to each other.

According to various embodiments, the flexible connecting member may further include at least two bridges, and the spacing between the at least two bridges may be less than or equal to ½ of a predetermined frequency wavelength.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
    a housing; and
    a flexible connecting member disposed inside the housing, the flexible connecting member comprising:
        a dielectric substrate,
        at least one signal wire disposed on one surface of the dielectric substrate, and
        at least one ground disposed on another surface of the dielectric substrate adjacent to the at least one signal wire, wherein the at least one ground and the at least one signal wire are arranged in parallel, and wherein the at least one signal wire and the at least one ground are disposed to be spaced apart from each other when viewed from above the dielectric substrate.

2. The electronic device of claim 1, wherein the flexible connecting member further includes a coverlay disposed to cover the at least one signal wire, the at least one ground, and the dielectric substrate.

3. The electronic device of claim 1, wherein a horizontal distance between the at least one ground adjacent to the at least one signal wire and the at least one signal wire is less than or equal to 60 μm.

4. The electronic device of claim 1, wherein the at least one signal wire has a width of less than or equal to 200 μm.

5. The electronic device of claim 1,
wherein the flexible connecting member comprises at least two grounds disposed on the other surface of the dielectric substrate, and
wherein the at least one signal wire is disposed between the at least two grounds when viewed from above the dielectric substrate.

6. The electronic device of claim 5,
wherein the flexible connecting member further comprises at least one bridge disposed between the at least two grounds, and
wherein the bridge is configured to connect the at least two grounds.

7. The electronic device of claim 6,
wherein the flexible connecting member comprises at least two bridges, and
wherein a spacing between the at least two bridges is less than or equal to ½ of a predetermined frequency wavelength.

8. The electronic device of claim 1, wherein the dielectric substrate has a thickness of 10 μm to 20 μm.

9. The electronic device of claim 1, wherein the flexible connecting member has an impedance of less than or equal to 50Ω.

10. The electronic device of claim 1, further comprising:
a first non-conductive member disposed on an outer surface of a coverlay.

11. A flexible connecting member comprising:
a dielectric substrate;
at least one signal wire disposed on one surface of the dielectric substrate; and
at least one ground disposed on another surface of the dielectric substrate adjacent to the at least one signal wire, wherein the at least one ground and the at least one signal wire are arranged in parallel, and wherein the at least one signal wire and the at least one ground are disposed to be spaced apart from each other when viewed from above the dielectric substrate.

12. The flexible connecting member of claim 11, further comprising:
a coverlay disposed to cover the at least one signal wire, the at least one ground, and the dielectric substrate.

13. The flexible connecting member of claim 11, wherein a horizontal distance between the at least one ground adjacent to the at least one signal wire and the at least one signal wire is less than or equal to 60 μm.

14. The flexible connecting member of claim 11, wherein the at least one signal wire has a width of less than or equal to 200 μm.

15. The flexible connecting member of claim 11, further comprising:
at least two grounds disposed on the other surface of the dielectric substrate,
wherein the at least one signal wire is disposed between the at least two grounds when viewed from above the dielectric substrate.

16. The flexible connecting member of claim 15, further comprising:
at least one bridge disposed between the at least two grounds,
wherein the bridge is configured to connect the at least two grounds to each other.

17. The flexible connecting member of claim 16, further comprising:
at least two bridges,
wherein a spacing between the at least two bridges is less than or equal to ½ of a predetermined frequency wavelength.

18. The flexible connecting member of claim 17, wherein the at least two bridges are disposed at central portions of the at least two grounds in a longitudinal direction of the at least two grounds.

19. The flexible connecting member of claim 18, wherein the at least two bridges are disposed at one of an upper portion or a lower portion of the at least two grounds in a longitudinal direction of the at least two grounds.

20. The flexible connecting member of claim 19, wherein, when the at least two bridges comprise four bridges, the four bridges are disposed between five grounds, and left two bridges of the four bridges are disposed at upper ends of the at least two grounds and right two bridges of the four bridges are disposed at the lower ends of the at least two grounds.

* * * * *